US006793868B2

(12) United States Patent
Kanematsu et al.

(10) Patent No.: US 6,793,868 B2
(45) Date of Patent: Sep. 21, 2004

(54) PLASTIC MOLDING AND METHOD AND APPARATUS FOR PRODUCING THE SAME BY INJECTION MOLDING

(75) Inventors: Toshihiro Kanematsu, Atsugi (JP);
Yasuo Yamanaka, Kawasaki (JP);
Akira Fukushima, Yokohama (JP);
Kiyotaka Sawada, Atsugi (JP);
Motoyasu Murai, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 405 days.

(21) Appl. No.: 09/878,991

(22) Filed: Jun. 13, 2001

(65) Prior Publication Data

US 2001/0031361 A1 Oct. 18, 2001

Related U.S. Application Data

(62) Division of application No. 09/053,050, filed on Apr. 1, 1998, now Pat. No. 6,287,504.

(30) Foreign Application Priority Data

Apr. 1, 1997 (JP) .............................................. 9-082985
Jun. 23, 1997 (JP) .............................................. 9-183049
Jul. 10, 1997 (JP) .............................................. 9-184244

(51) Int. Cl.$^7$ ................................................ B29C 45/57
(52) U.S. Cl. .......................... 264/500; 264/1.1; 425/812
(58) Field of Search .......................... 264/1.9, 1.7, 327, 264/1.1, 328.16, 500, 572, 328.1; 425/552, 555, 808, 812

(56) References Cited

U.S. PATENT DOCUMENTS

| 2,911,678 A | * | 11/1959 | Brunfeldt | ..................... 264/102 |
| 3,608,058 A | * | 9/1971 | Coffman | ..................... 264/313 |
| 4,101,628 A | * | 7/1978 | Wiik | ..................... 264/325 |
| 4,548,773 A | * | 10/1985 | Suh et al. | .................. 264/40.6 |
| 4,963,312 A | * | 10/1990 | Muller | ........................ 264/327 |
| 5,603,871 A | * | 2/1997 | Koseko et al. | ............... 264/1.9 |
| 6,015,514 A | * | 1/2000 | Koseko | ..................... 264/40.1 |

* cited by examiner

*Primary Examiner*—Mathieu D. Vargot
(74) *Attorney, Agent, or Firm*—Oblon, Spivak, McClelland, Maier & Neustadt, P.C.

(57) ABSTRACT

A method of producing a molding by injection molding, wherein only a part of the molding expected to sink is surely caused to sink while, e.g., a mirror surface is surely transferred to a desired part of the molding.

5 Claims, 22 Drawing Sheets

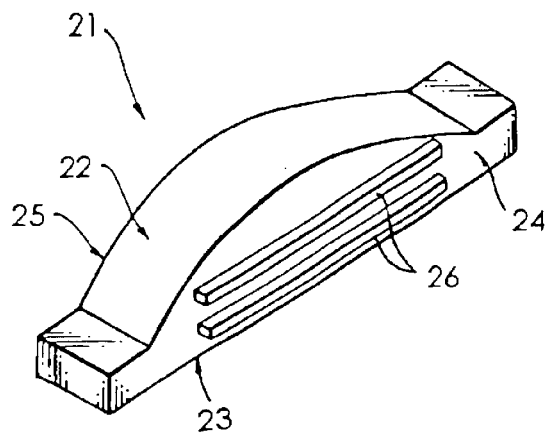
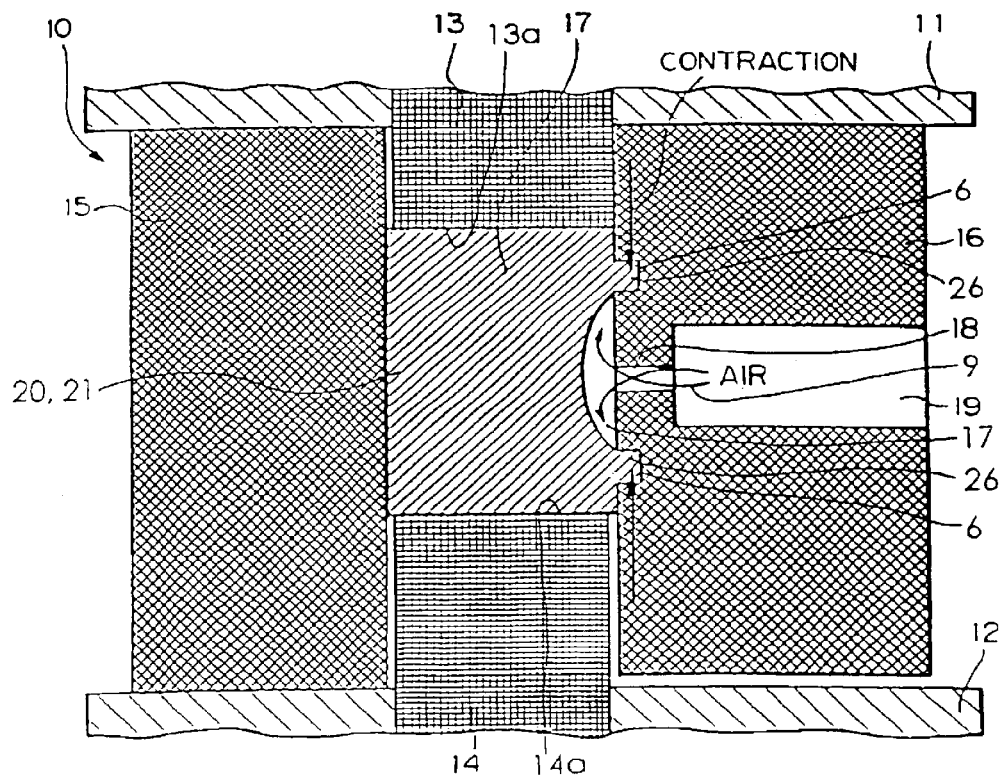

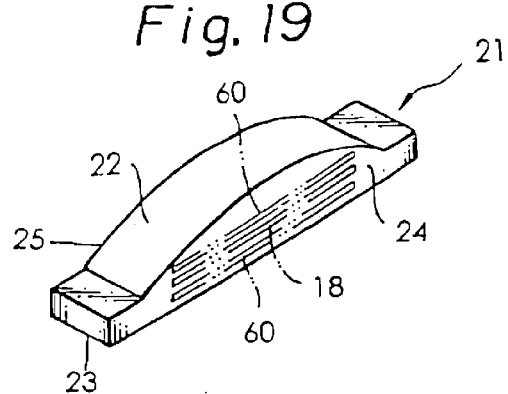
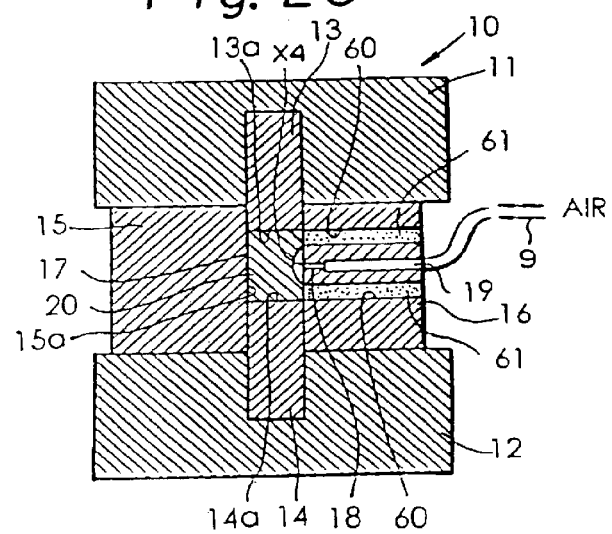
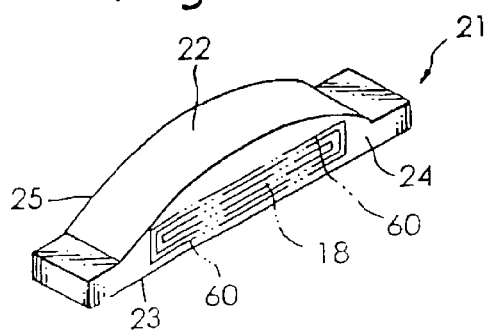
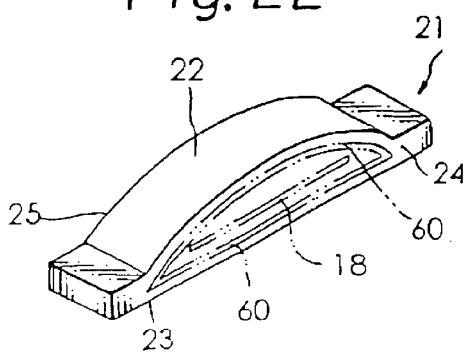

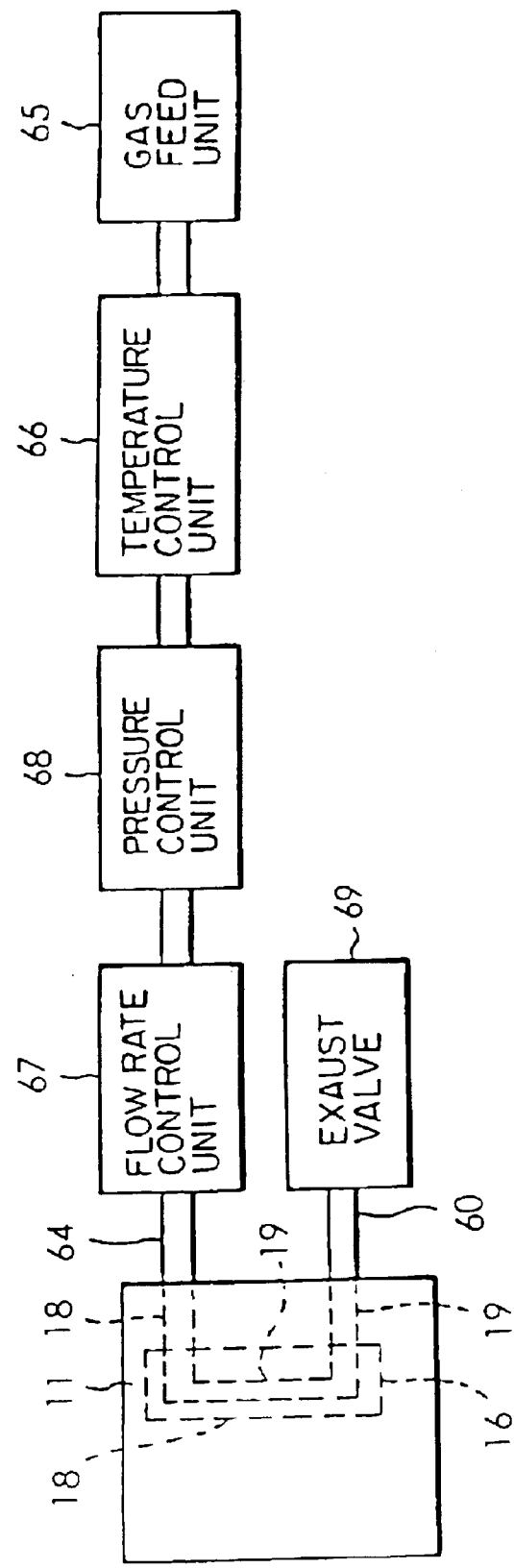

PLASTIC MOLDING AND METHOD AND APPARATUS FOR PRODUCING THE SAME BY INJECTION MOLDING

BACKGROUND OF THE INVENTION

The present invention relates to a method for producing a lens, mirror, prism or similar plastic molding produced by injection molding and included in an optical device, e.g., a copier, laser printer, facsimile apparatus or similar image forming apparatus, and a method and an apparatus for producing the same. More particularly, the present invention is concerned with a method for producing a plastic molding having, e.g., mirror surfaces and a fine undulation pattern transferred thereto with high accuracy by injection molding.

For injection molding, it is a common practice to use a mold assembly including a mold surface forming a cavity having a preselected volume, a transfer surface formed on the mold surface for transferring a mirror surface to a molding, and a gate open at the mold surface and having a preselected opening area. Molten resin is injected into the cavity via the gate and then cooled. The resulting molding is taken out by opening the mold assembly. While such a molding, particularly a mirror, lens, prism or similar optical element, is required to have an accurate mirror surface and a uniform refractive index, the mirror surface needing a high surface accuracy is caused to sink because the molten resin contracts at the time of solidification.

Injection molding methods for solving the above problem are taught in, e.g., Japanese Patent Laid-Open Publication Nos. 3-128218, 8-234005, 3-151218, and 3-281213 (Prior Art 1 hereinafter). In prior Art 1, a non-transfer surface or mold surface facing a transfer surface formed with, e.g., a mirror surface is roughened, or surface treated for lowering wettability, or use is made of a porous material. Injection is stopped just before a cavity is filled up with molten resin. Then, the molten metal is solidified by cooling without any dwelling. As a result the roughened surface is caused to sink due to a difference in adhering force between the molten resin, the transfer surface, and the roughened surface. This prevents the mirror from sinking. Alternatively, an overflow portion for receiving excess molten resin is located outside of the cavity. When the overflow portion begins to be filled, injection is stopped. Then, the molten resin is solidified by cooling without any dwelling. This also allows the roughened surface to sink due to a difference in adhering force between the resin, the transfer surface, and the roughened surface.

An injection molding method disclosed in Japanese Patent Laid-Open Publication No. 2-175115 (Prior Art 2 hereinafter) injects molten metal into a cavity in which a porous member communicated to a compressed gas is provided on a mold surface contacting the non-transfer surface of a molding. While dwelling and cooling are under way after the injection of the molten resin, air is fed to the non-transfer surface of the molding via the porous member. With this method, it is possible to cause a side of a cylindrical thin lens to sink.

Japanese Patent Laid-Open Publication No. 6-304973 (Prior Art 3 hereinafter) proposes an injection molding method in which a non-transfer surface is communicated to the outside air via a vent hole. During an interval between the beginning and the end of injection of molten resin into a cavity, a pressure difference is generated between the transfer surface and the non-transfer surface of the resin. As a result, the non-transfer surface of the resin is caused to sink. Specifically, air is brought into contact with the molten resin other than the mirror transferred from the transfer surface via the vent hole and a bore communicated thereto, so that the cooling speed of the resin is lowered. At the same time, a preselected air pressure is fed to the vent hole in order to generate a preselected pressure difference between the mirror portion of the resin and the vent hole. This allows only the portion of the resin facing the vent hole to sink, i.e., prevents the mirror portion from sinking. In addition, because only the vent hole portion of the resin sinks, a molding can be produced by simple control over the amount of the resin to be injected into the cavity and without any strain being generated in the resin. The resulting molding is therefore free from an internal strain and provided with an accurate mirror surface.

Prior Art 3 further teaches that the vent hole may be communicated to a compressor so as to apply a preselected air pressure to the vent hole portion of the resin. With this configuration, it is possible to generate any desired pressure difference between the mirror surface portion and the vent hole portion of the resin, thereby causing the vent hole portion to sink. In addition, the pressure difference is readily adjustable in order to further enhance the accuracy of the mirror surface without any internal strain.

Japanese Patent Laid-Open Publication No. 6-31596 (Prior Art 4 hereinafter) teaches an injection molding method causing the non-transfer surface of resin to sink. In accordance with this method, the transfer surface of a mold heated to and held at a high temperature. The transfer surface side of the resin is heated to a high temperature until the injection of molten resin into a cavity ends.

However, Prior Art 1 relying on the roughened surface, surface treatment or porous material results in an expensive mold assembly. Moreover, stopping the injection just before the cavity is filled up with the molten metal is extremely difficult. Should the timing for stopping the injection be deviated, the relation in adhering force between the transfer surface and the roughened surface would be inverted and would thereby cause the mirror surface to sink or result in short resin. In addition, because sinking cannot be provided with directionality and because setting the molding conditions is difficult, the configuration of the molding is critically limited. The filling of the molten resin may be stopped at any time lying in a broader range. However, the overflow portion formed integrally with the molding must be removed by an extra step. Moreover, should the opening area of the gate for feeding the molten resin to the overflow portion be excessively small, the relation in adhering force between the transfer surface and the roughened surface would also be inverted and would thereby cause the mirror surface to sink. Should the opening area be excessively small, the molten resin would become short.

Prior art 1 can implement a mirror or similar optical element needing a single mirror surface because it roughens the mold surface facing the transfer surface. However, Prior Art 1 cannot produce a lens, prism or similar optical element because the number and positions of mirror surfaces are limited. In addition, the relation in adhering force is inverted and causes the mirror surface to sink, depending on the material constituting the transfer surface and roughened surface and the kind of the resin.

Prior Art 2 increases the cost of the mold assembly due to the porous member and sophisticates control over the configuration of the porous member. Specifically, if the effect of the porous member is excessive, it not only admits the molten metal thereinto, but also obstructs the parting of the molding. This is particularly true when the porous portion of the porous member extends inward over the wall of the mold. Further, because the compressed gas is fed to the non-transfer surface of the molding via the porous member during the previously stated interval, a pressure difference is maintained between the non-transfer surface and the transfer surface of the resin during cooling. As a result, the internal strain remains in the resulting molding after the opening of the mold. The residual pressure not only lowers the accuracy of the transfer surface, but also causes the entire molding to deform.

Prior Art 3 generates a pressure difference between the transfer surface and the non-transfer surface of the resin during the interval mentioned earlier. This also brings about the problem stated above in relation to Prior Art 2. Prior Art 4 maintains the transfer surface of the mold at a high temperature and heats the transfer surface side of the resin to a high temperature during the previously mentioned interval. This is also undesirable in the above respect.

SUMMARY OF THE INVENTION

It is therefore an object of the present invention to provide a method for producing a plastic molding capable of surely sinking only at a desired portion thereof and being surely provided with a mirror surface in another desired portion thereof.

It is another object of the present invention to provide an inexpensive and least deformable plastic molding capable of surely guiding sinking to a non-transfer surface thereof and therefore having a highly accurate transfer surface.

In accordance with the present invention, in a molding produced by an injection mold assembly having a pair of molds including a mold surface forming a cavity having a preselected volume, at least one transfer surface for transferring a mirror surface formed on the mold surface to the molding, and a gate for filling the cavity with a molten material by injection, and by injecting the molten material into the cavity via said gate and then cooling the molten material, the injection mold assembly includes at least one vent hole having a preselected opening area, and at least one bore communicated to the vent hole for applying a preselected air pressure to the molding. A step portion is formed on the mold surface between the vent hole and the transfer surface. Also, in accordance with the present invention, in an injection molding method for producing a molding by using a mold assembly having a pair of molds including a mold surface forming a cavity having a preselected volume, at least one transfer surface for transferring a mirror surface formed the mold surfaces to the molding, and a gate for filling the cavity with a molten material by injection, and by injecting the molten material into the cavity via the gate and then cooling the molten material, the mold surface is formed with, outside of the transfer surface, at least one vent hole having a preselected opening area and at least one bore communicated to the vent hole for applying a preselected air pressure to the molding material. The air pressure is continuously generated via the vent hole even after the pressure of the molding material in the cavity has dropped to zero.

Further, in accordance with the present invention, a mold assembly has a pair of molds including a mold surface forming a cavity having a preselected volume, at least one transfer surface for transferring a mirror surface formed on the mold surface to the molding, and a gate for filling the cavity with a molten material by injection, and injects the molten material into the cavity via the gate and then cools the molten material. The mold surface is formed with, outside of the transfer surface, at least one vent bole having a preselected opening area and at least one bore communicated to the vent hole for applying a preselected air pressure to the molding material, and at least one exhaust hole located at a position adjoining the vent hole, but not facing the transfer surface.

Moreover, in accordance with the present invention, a method of producing a plastic molding begins with the step of preparing a mold assembly including at least one transfer surface and at least one non-transfer surface formed on a surface other than the transfer surface. The transfer surface and non-transfer surface form at least one cavity. Molten resin heated to a temperature above a softening point thereof is injected into the cavity. A resin pressure is caused to act on the transfer surface to thereby cause the resin to adhere to the transfer surface, and then the resin is cooled to a temperature below the softening point. The mold assembly is opened in order to allow the resulting molding to be taken out. The temperature of at least one non-transfer surface of the resin is lowered below the temperature of the resin on the transfer surface during an interval between the beginning and the end of injection of the resin into the cavity.

BRIEF DESCRIPTION OF THE DRAWINGS

The above and other objects, features and advantages of the present invention will become more apparent from the following detailed description taken with the accompanying drawings in which:

FIG. 7A is a perspective view showing a molding representative of a first embodiment of the present invention;

FIG. 7B is a fragmentary cross-sectional view of the mold assembly used to form the molding shown in FIG. 7A;

FIG. 19 is a perspective view showing a positional relationship between a vent hole and an exhaust hole included in the eleventh embodiment;

FIG. 20 is a cross-sectional of an injection mold assembly representative of a twelfth embodiment of the present invention;

FIG. 21 is a perspective view showing the position of an exhaust hole formed in an injection mold assembly representative of a thirteenth embodiment of the present invention;

FIG. 22 is a perspective view showing a modification of the thirteenth embodiment;

FIG. 31 is a top plan view showing a method and an apparatus for producing a plastic molding representative of an eighteenth embodiment of the present invention;

DESCRIPTION OF THE PREFERRED EMBODIMENTS

Figure 1:
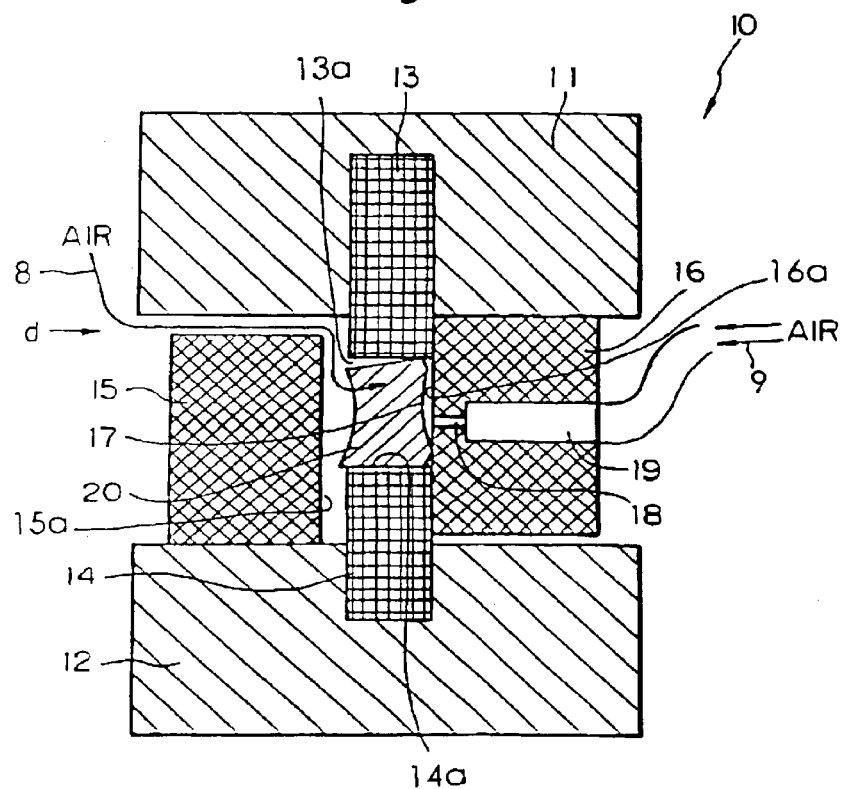
FIG. 1 is a fragmentary view showing a conventional injection mold assembly.

To better understand the present invention, brief reference will be made to the injection molding method taught in Prior Art 3 mentioned earlier. As shown in FIG. 1, a mold assembly 10 is made up of a stationary mold 11 and movable mold 12, mirror pieces 13 and 14, a reference insert 15, and a sink insert 16 together forming a cavity 17 having a preselected volume. The mirror pieces 13 and 14 respectively have transfer surfaces or mold surfaces 13a and 14a for transferring mirror surfaces to a molding. The reference insert 15 has a mold surface 15a defining the reference surface (C surface) of a molding. The sink insert 16 has a mold surface 16a implementing a surface for causing a molding to sink (B surface). Molten resin or similar molten molding material 20 is injected into the cavity 17 via a gate (not shown). The mold surface of the sink insert 16 is formed with a vent hole 18 having a preselected opening area, and a bore 19 communicated to the vent hole 18. Air 9 under preselected pressure is fed to the material 20 via the bore 19 and vent hole 18.

Figure 2:
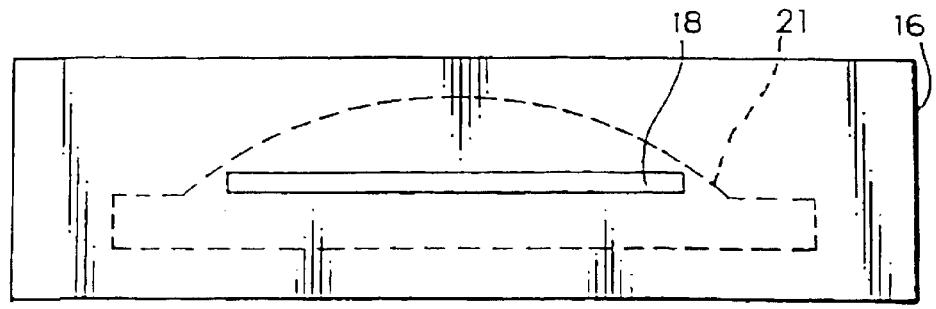
FIG. 2 is a plan view showing a specific vent hole formed in the mold surface of a sink insert included in the mold assembly of FIG. 1.

FIG. 2 shows a specific configuration of the vent hole 18 formed in the sink insert 16 and extending to the mold surface 16a. To feed air to the material 20, use may be made of natural draft utilizing a pressure difference between the mirror portion of the material 20 and the vent hole portion, or forced draft generating a desired pressure difference between the two portions with a compressor (not shown) communicating with the vent hole 18.

In the mold assembly 10, the vent hole 18 is positioned at the side of a molding which is expected to sink. When air 9 is fed to the cavity 17 via the bore 19 and vent hole 18, sinking successfully occurs in the expected surface of the molding. In addition, the transfer surfaces 13a and 14a of the mirror pieces 13 and 14 are desirably transferred to the molding. The molding therefore suffers from a minimum of internal strain.

Figure 3A:
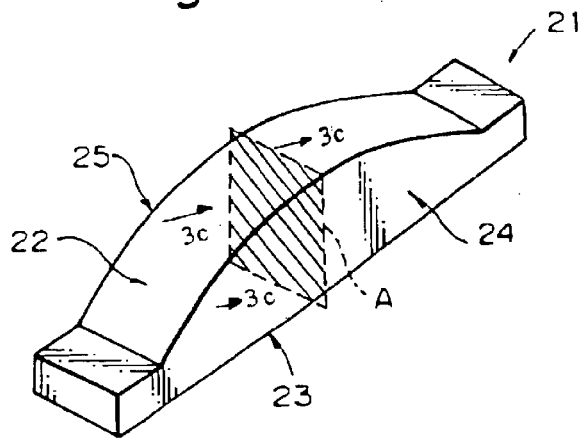
FIG. 3A is a perspective view showing a specific molding produced by the mold assembly of FIG. 1.
Figure 3B:
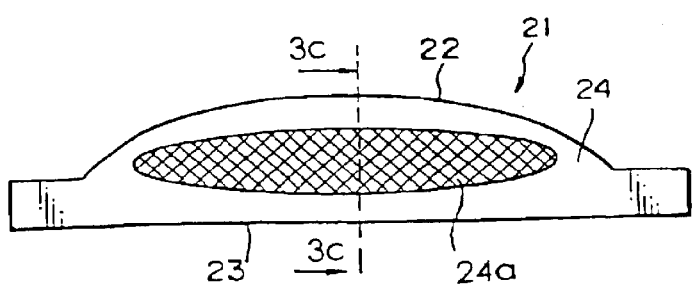
FIG. 3B is a side elevational view of the molding of FIG. 3A.
Figure 3C:
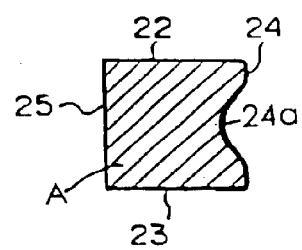
FIG. 3C is a cross-sectional view taken along line 3c—3c of FIG. 3B.

A specific molding 21 produced by the mold assembly 10 is shown in FIGS. 3A–3C. As shown, the molding is implemented as a rectangular lens having mirror surfaces (optical surfaces) 22 and 23 transferred from the mirror surfaces 13a and 14a of the mirror pieces 13 and 14, respectively. FIG. 3B shows the surface 24 of the lens 21 to be caused to sink (B surface); a sinking area 24a is indicated by crosshatching. As shown, desired sinking occurs on the B surface 24 of the lens 21. As a result, the mirror surfaces 22 and 23 are desirably transferred to the lens 21, reducing the internal strain of the lens 21.

Figure 4A:
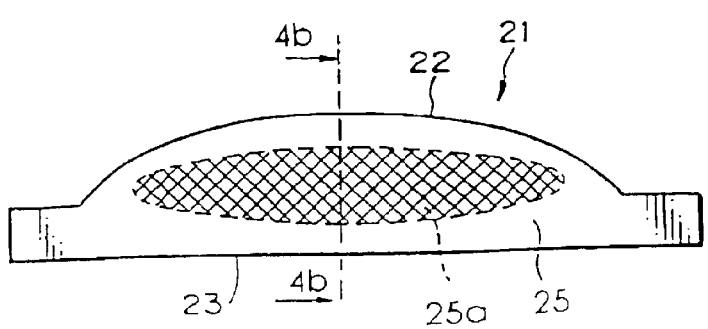
FIG. 4A is a side elevational view showing a specific molding produced by injection molding with an air stream flowing toward the reference surface of a cavity.
Figure 4B:
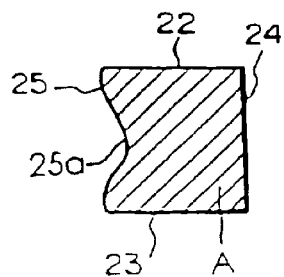
FIG. 4B is a cross-sectional view along line 4b—4b of FIG. 4A.

However, the injection mold assembly 10 has the following problems left unsolved. If the various mold parts 11–16 constituting the mold 10 lack in accuracy, either individually or in combination, a gap d is formed between the parts, as shown in FIG. 1. Then, air 8 is likely to flow into the cavity 17 via the gap d and prevent the desired surface from sinking. FIGS. 4A and 4B are views similar to FIGS. 3A and 3B, showing a lens 21 molded with an air stream 8 flowing into the reference surface side 25 (C surface) of the cavity 17. As shown, the lens 21 fails to sink to a desired degree or practically fails to sink at its expected surface (B surface). In the worst case, a C surface 25 is caused to sink (see 25a in FIG. 4B) and looses surface accuracy as a reference surface.

Figure 5A:
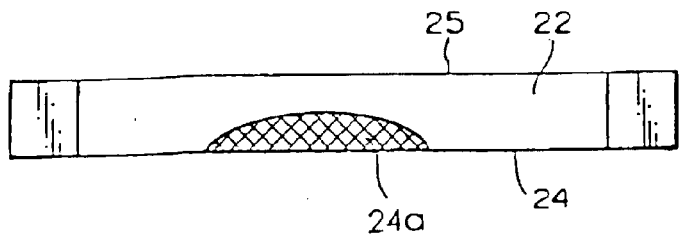
FIG. 5A is a top plan view showing a specific molding produced by injection molding and caused to sink as far as its mirror surface portion.
Figure 5B:
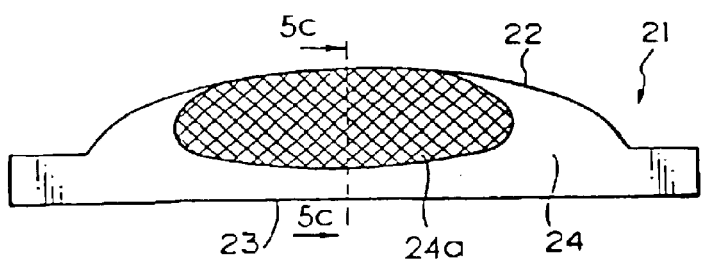
FIG. 5B is a side elevational view of the molding shown in FIG. 5A.
Figure 5C:
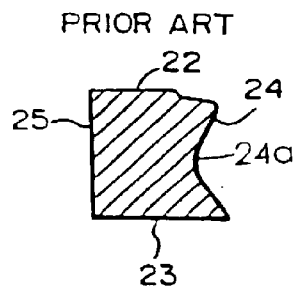
FIG. 5C is a cross-sectional view along line 5c—5c of FIG. 5B.

Further, when air 9 is introduced into the cavity 17 via the vent hole 18 by either natural draft or forced draft, it is apt to reach the mirror surfaces 22 and 23 and cause them to sink also, depending on the amount of resin filled in the cavity 17 or the amount of air. A lens or molding 21 caused to sink as far as its mirror surfaces 22 and 23 is shown in a top plan view in FIG. 5A, in a side elevational view in FIG. 5B, and in a cross-sectional view taken along line 5c—5c of FIG. 5B in FIG. 5C. As shown, a sunken region 24a formed in the sunk surface or B surface 24 extends even to the mirror surface 22 and introduces a strain in the mirror surface 22, thereby deteriorating the ability of the lens.

Preferred embodiments of the present invention will be described hereinafter.

Figure 6:
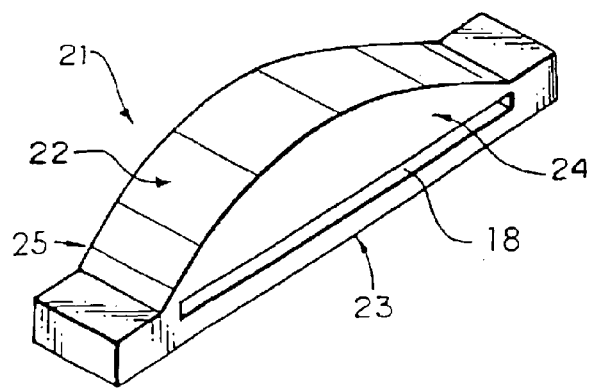
FIG. 6 shows a relationship between the molding produced by the mold assembly of FIG. 1 and the position of a vent hole.

FIG. 6 is a prior art figure showing the positional relationship between the conventional molding 21 and the vent hole 18 of the mold assembly 10. The relation shown in FIG. 6 brings about the problem discussed with reference to FIGS. 5A–5C. A first embodiment of the present invention eliminates such a problem by providing a molding with steps between a vent hole and mirror surfaces.

First Embodiment

Specifically, FIG. 7A shows a specific molding 21 representative of the first embodiment. FIG. 7B is a partial cross-sectional view of an injection mold assembly 10 for producing the molding 21. Basically, the mold assembly 10 is similar to the conventional mold assembly shown in FIG. 1, and has its structural elements designated by the same reference numerals. The difference is that, as shown in FIG. 7B, the mold assembly 10 of the first embodiment includes a cavity 17 and indentations 6 formed in a sink insert 16 between a vent hole 18 and transfer surfaces 13a and 14a of the mirror inserts 13 and 14 respectively, wherein the indentations 6 are for forming steps 26 on the molding 21.

More specifically, the molding 21 is implemented as a rectangular lens having two mirror surfaces (optical surfaces) 22 and 23 playing the role of lens surfaces. The molding 21 includes a surface 24 to be caused to sink (B surface). The steps 26 are formed on the surface 24 between the vent hole 18 and the opposite mirror surfaces 22 and 23, isolating the mirror surfaces 22 and 23 from the vent hole 18.

As shown in FIG. 7B, the sink insert 16 of mold assembly 10 includes the indentations 6 complementary in configuration to the steps 26 of the molding and formed on the mold surface between the vent hole 18 and the mirror surfaces. Just after molten resin or molten molding material 20 has been injected into the cavity 17, air 9 is forced out of the cavity 17 via the vent hole 18 and a bore 19 due to the high internal pressure of the molten resin 20. The internal pressure of the molten resin 20 sequentially decreases as the molten resin 20 is cooled. When the pressure of the molten resin 20 decreases below the atmospheric pressure or below a compression pressure (when a compressor communicates with the vent hole 18 via the bore 19), air 9 begins to flow into the cavity 17 via the vent hole 18, causing the molten resin 20 to sink away from the vent hole 18. Should the steps 26 be absent on the molten resin 20, the molten resin 20 might sink as far as its mirror surfaces. In the illustrative embodiment, the steps 26 isolating the mirror surfaces 22 and 23 from the vent hole 18 tend to contract toward each other, as indicated by arrows in FIG. 7B. However, the indentations 6 of the sink insert 16 of the mold assembly 10 interfere with the steps 26 and prevent the steps 26 from contracting. As a result, the molten resin 20 and mold assembly 10 remain in close contact with each other and prevent sinking from proceeding over the steps 26, i.e., confine it to the region between the steps 26. The molding 21 is therefore caused to sink only in its expected portion and surely formed with the mirror surfaces 22 and 23 by transfer.

Second Embodiment

Figure 8:
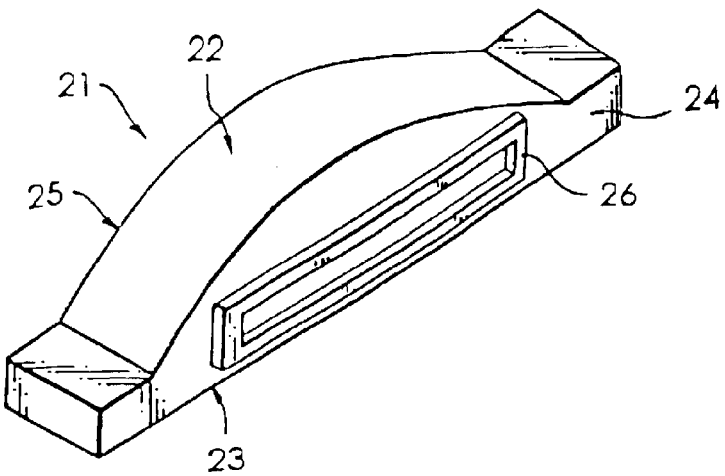
FIG. 8 is a perspective view of a molding representative of a second embodiment of the present invention.

FIG. 8 shows a molding 21 representative of a second embodiment of the present invention and produced by injection molding. The molding 21 is also implemented as a lens similar in configuration to the lens of FIG. 7A. As shown, a step 26 is formed on the B surface 24 of the molding 21 adjoining the vent hole (not shown) such that the step 26 surrounds the vent hole (not shown). The step 26 surrounding the vent hole (not shown) prevents air 9 from turning around and allows the sinking region to be controlled more positively than in the first embodiment.

Third Embodiment

Figure 9A:
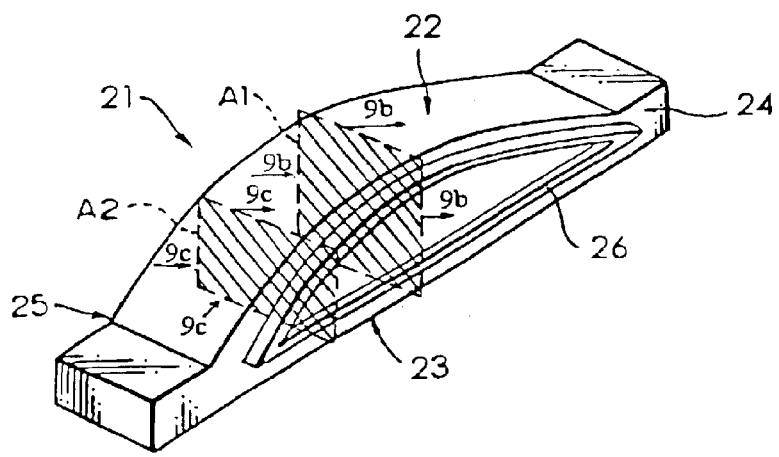
FIG. 9A is a perspective view of a molding representative of a third embodiment of the present invention.
Figure 9B:
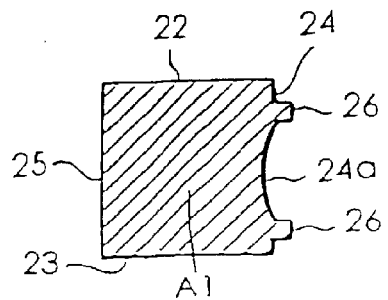
FIG. 9B is a cross-sectional view of the third embodiment in plane A1 of FIG. 9A.
Figure 9C:
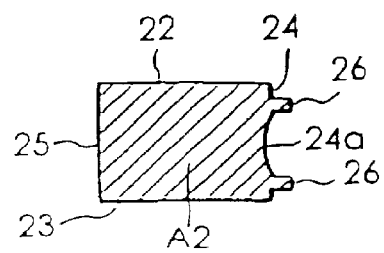
FIG. 9C is a cross-sectional view of the third embodiment in plane A2 of FIG. 9A.

FIGS. 9A–9C show a molding 21 representative of a third embodiment of the present invention. The molding 21 is also implemented as a lens similar in configuration to the lens of FIG. 7A. As shown, a step 26 is formed on the side (B surface) 24 of the molding adjoining the vent hole (not shown). The step 26 is substantially similar in configuration to the contour of the side 24. Specifically, when the molding 21 is a rectangular lens, the step 26 surrounds the vent hole (not shown) complementarily to the contour of the side of the lens. A sinking region can therefore be controlled in the same ratio as the sectional area of each section of the molding 21 (see section A1 or A2 or shown in FIGS. 9A–9C). This successfully makes the internal strain and surface accuracy uniform and thereby enhances the accuracy of the lens 1.

Figure 10A:
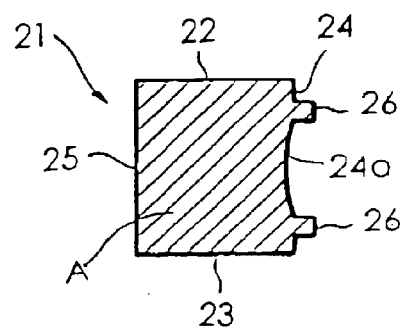
FIGS. 10A and 10B are cross-sectional views each showing a particular configuration of steps included in the third embodiment in the direction of height.
Figure 10B:
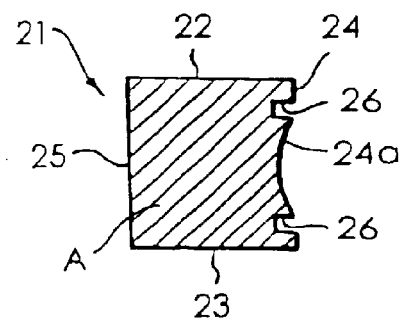

As shown in FIG. 10A, the steps 26 of the first to third embodiments each are implemented by projections extending outwardly from the sink surface or B surface 24 of the molding 21. Alternatively, as shown in FIG. 10B, the steps 26 may be implemented by recesses formed in the molding 21. The recesses are also successful to control the sinking region. When the steps 26 are implemented by such recesses, the mold assembly 10 will be formed with steps in the form of projections around the vent hole 18.

Fourth Embodiment

Figure 11A:
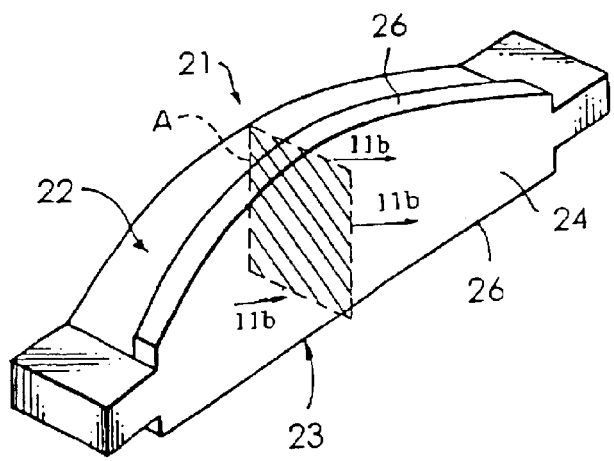
FIG. 11A is a perspective view of a molding representative of a fourth embodiment of the present invention.
Figure 11B:
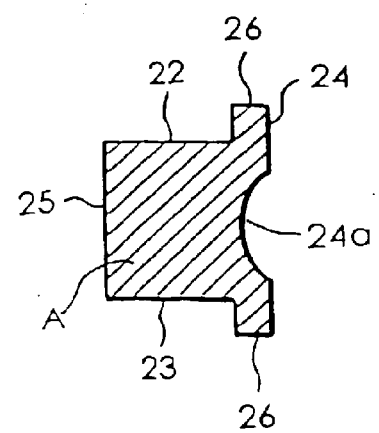
FIG. 11B is a cross-sectional view taken along plane A of FIG. 11A.

FIGS. 11A and 11B show a molding 21 representative of a fourth embodiment of the present invention. As shown, steps 26 are formed on the mirror surfaces 22 and 23 of the molding 21. This configuration also prevents air 9 from reaching the mirror surfaces 22 and 23 via the vent hole (not shown) because the steps 26 of the molding 21 and the indentations 6 of the mold assembly (not shown) remain in close contact with each other.

Fifth Embodiment

Figure 12A:
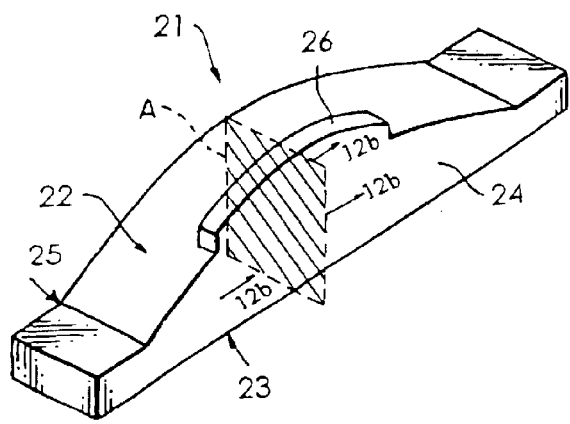
FIG. 12A is a perspective view of a molding representative of a fifth embodiment of the present invention.
Figure 12B:
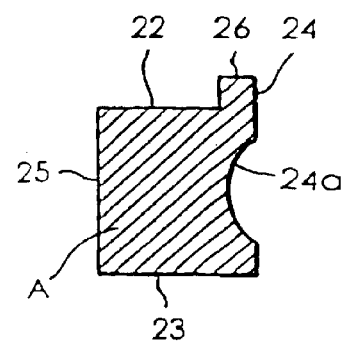
FIG. 12B is a cross-sectional view taken along plane A of FIG. 12A.

FIGS. 12A and 12B show a molding 21 representative of a fifth embodiment of the present invention. As shown, a step 26 is formed on a part of a mirror surface 22 or 23. Specifically, when it is known that air 9 will turn around to a part of the mirror surface 22 or 23 of the molding 21 and cause it to sink beforehand, the step 26 may be formed only in such a part of the mirror surface 22 or 23. This configuration saves cost when a mold assembly (not shown) is formed with an indentation 6.

Sixth Embodiment

Figure 13A:
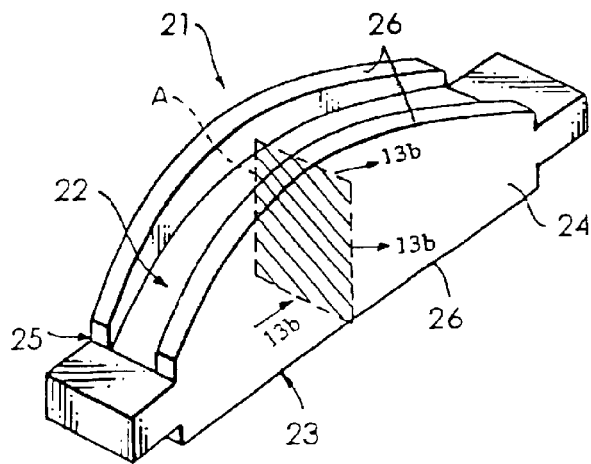
FIG. 13A is a perspective view of a molding representative of a sixth embodiment of the present invention.
Figure 13B:
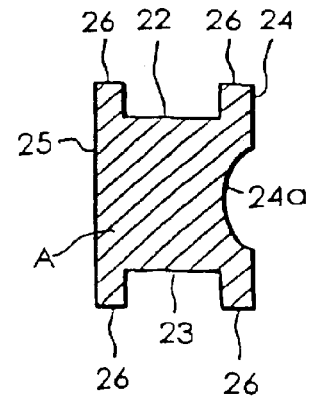
FIG. 13B is a cross-sectional view taken along plane A of FIG. 13A.

FIG. 13A shows a molding 21 representative of a sixth embodiment of the present invention. FIG. 13B is a cross-sectional view taken along plane 13b—13b—13b of FIG. 13A. As shown, steps 26 are formed on opposite edges of the mirror surface 22 contiguous with the sink surface or B surface 24 and C surface 25, respectively. Likewise, steps 26 are formed on opposite edges of the other mirror surface 23 contiguous with the sink surface or B surface 24 and C surface 25, respectively. As shown in FIG. 1, when the mold assembly 10 is not accurate, air is apt to enter the cavity 17 via an unexpected portion. As a result, as shown in FIGS. 4A and 4B specifically, air is likely to flow into the reference surface (C surface) side of the cavity 17 and turn around to the mirror surfaces 22 and 23 to cause them to sink. In the illustrative embodiment, the steps 26 formed on both longitudinal edges of the mirror surface 22 and those of the mirror surface 23 prevent air from turning around to the mirror surfaces 22 and 23 and causing them to sink.

Seventh Embodiment

Figure 14A:
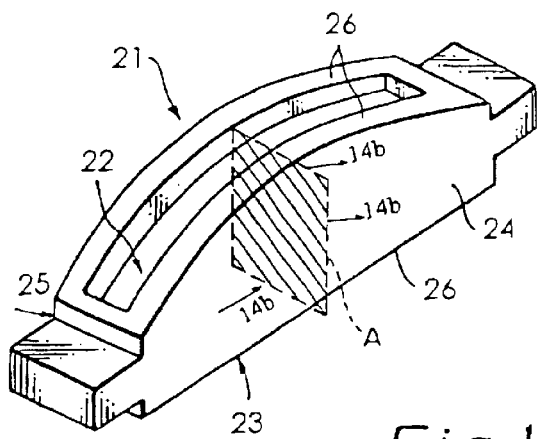
FIG. 14A is a perspective view of a molding representative of a seventh embodiment of the present invention.
Figure 14B:
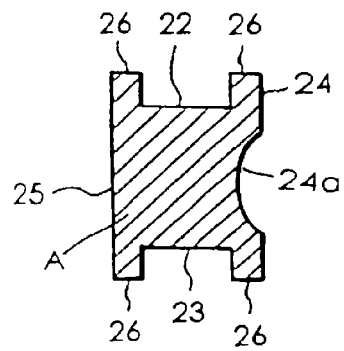
FIG. 14B is a cross-sectional view taken along plane A of FIG. 14A.

FIG. 14A shows a molding 21 representative of a seventh embodiment of the present invention. FIG. 14B is a cross-sectional view taken along plane 14b—14b—14b of FIG. 14A. As shown, the molding 21 is identical with the molding 21 shown in FIG. 13A except that the steps 26 facing each other on each of the mirror surfaces 22 and 23 are replaced with a single step 26 surrounding the mirror surface 22 or 23. The steps 26 can obstruct air 9 more positively and can therefore prevent the mirror surfaces 22 and 23 from sinking more positively.

Eighth Embodiment

Figure 15:
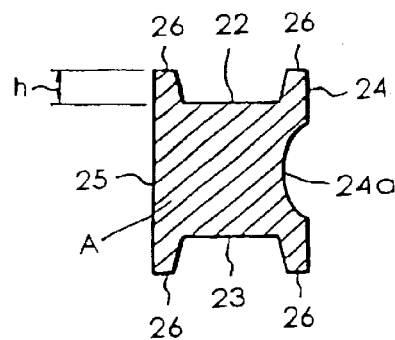
FIG. 15 is a cross-sectional view of a molding representative of an eighth embodiment of the present invention and including tapered steps.

To obstruct air 9 tending to reach the mirror surfaces 22 and 23 of the molding 21, the steps 26 shown in FIGS. 13B or 14B suffice. FIG. 15 shows a molding 21 configured to be easily separable from a mold assembly 10. As shown, the steps 26 each extends in the direction of height h. With such steps 26, the molding can be easily separated from a mold assembly 10 while preserving its accuracy.

Ninth Embodiment

Figure 16A:
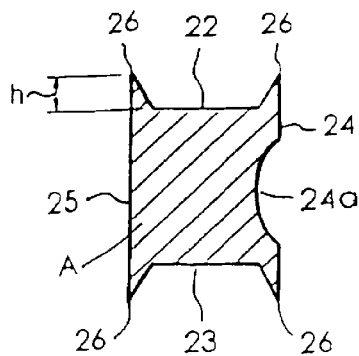
FIGS. 16A and 16B are cross-sectional views each showing a particular configuration of a molding representative of a ninth embodiment of the present invention.
Figure 16B:
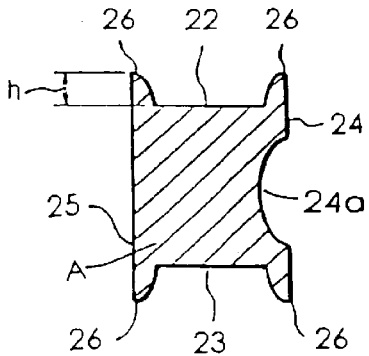

FIGS. 16A and 16B each shows a particular molding 21 representative of a ninth embodiment of the present invention. As shown, steps 26 facing each other at both edges of each mirror surface 22 and 23 are provided with a triangular cross-section (FIG. 16A) or an arcuate cross-section (FIG. 16B). This not only enhances the parting ability of the molding 21, but also simplifies the procedure for forming indentations 6 in, e.g., the mirror pieces 13 and 14 of mold assembly 10.

In each of the eighth and ninth embodiments, the steps 26 each have a height h greater than 0.1 mm inclusive.

Experiments showed that heights h greater than 0.1 mm inclusive can sufficiently obstruct air.

Tenth Embodiment

This embodiment relates to a method of forming a molding 21 and will be described with reference to FIG. 7B. First, the movable mold 12, carrying the mirror piece 14 and the reference insert 15 therewith, is brought into contact with the stationary mold 11 loaded with the other mirror insert 13 and the sink insert 16. As a result, the mold surfaces of the molds 11 and 12 form the cavity 17 having a preselected volume. A gate (not shown) is formed in a mold surface (not shown) of the mold assembly 10 in order to inject the molten resin 20 into the cavity 17. A conventional filling machine (not shown) is connected to the gate in order to fill the cavity 17 with the molten resin 20 by injection.

Just after molten resin or molten molding material 20 has been injected into the cavity 17, air is forced out of the cavity 17 via the vent hole 18 and a bore 19 due to the high internal pressure of the molten resin 20. The internal pressure of the molten resin 20 sequentially decreases as the molten resin 20 is cooled. When the pressure of the molten resin 20 decreases below the atmospheric pressure or below a compression pressure (when a compressor communicates with a vent hole 18 via the bore 19), air 9 begins to flow into the cavity 17 via the vent hole 18, causing the molten resin 20 to sink away from the vent hole 18. At this instant, the steps 26 isolating the mirror surfaces 22 and 23 from the vent hole 18, as shown in, e.g., FIG. 7A, tend to contract toward each other, as indicated by arrows in FIG. 7B. However, the indentations 6 of the mold assembly 10 interfere with the steps 26 and prevent them from contracting. As a result, the molten resin 20 and mold assembly 10 remain in close contact with each other and prevent sinking from proceeding over the steps 26.

Figure 17A:
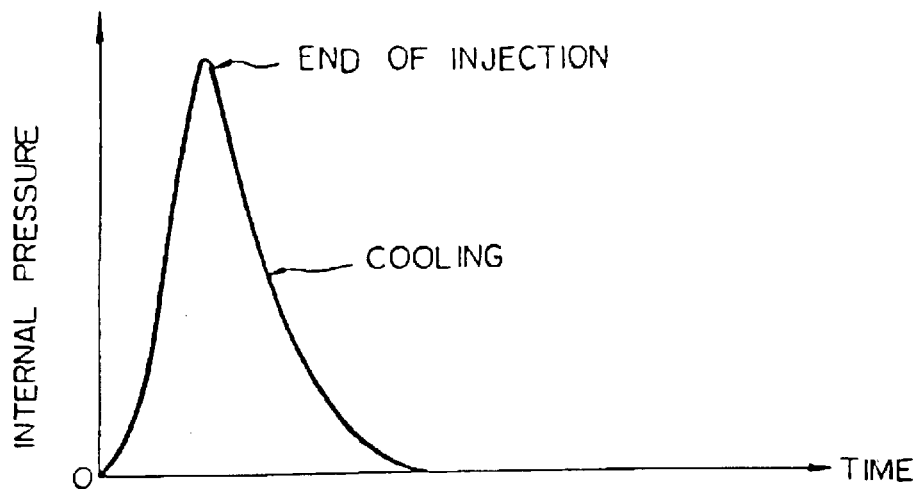
FIGS. 17A and 17B are graphs showing the variation of the internal pressure of molten resin existing in a cavity occurring from the beginning to the end of cooling of the molten resin, and a timing for switching an air pressure fed via a vent hole.
Figure 17B:
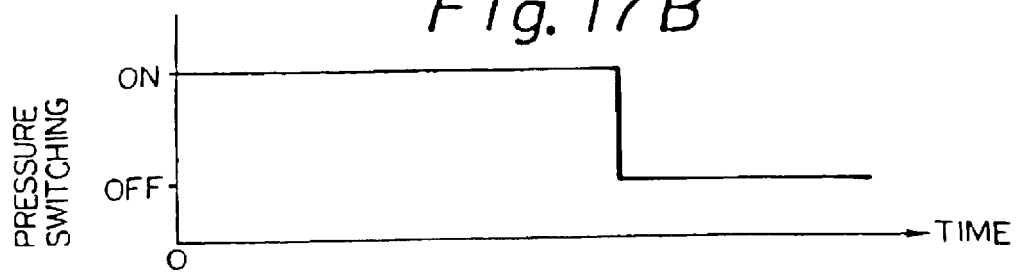

FIG. 17A shows how the internal pressure of the molten resin 20 varies from the time when the molten resin 20 begins to be injected into the cavity 17 to the time when it is fully cooled off. In the case where air 9 under pressure is fed via the vent hole 18, its pressure is switched in a manner shown in FIG. 17B. As shown, in the illustrative embodiment, air 9 is continuously fed even after the internal pressure of the molten resin 20 has been lowered to zero, generating air pressure in the vent hole portion. Experiments showed that the air pressure continuously generated even after the drop of the resin pressure to zero allows the sinking region 24a to be surely controlled.

More specifically, the molten resin 20 remains in close contact with the mold assembly 10 until the internal pressure of the molten resin 10 drops to zero, and sinking occurs thereafter. It is therefore necessary to apply the air pressure for some more period of time after the internal pressure has dropped to zero. It was found that when the molding 21 is implemented as a lens, as shown and described, the sinking region 24a can be controlled if the air pressure is continuously applied for more than 5 seconds even after the drop of the internal pressure of the molten resin 20 to zero. The air pressure should preferably be higher than the atmospheric pressure (about 0.1 MPa) inclusive, but lower than 2 MPa inclusive.

The first to tenth embodiments shown and described achieve the following various unprecedented advantages.

(1) In a molding 21 formed by an injection mold assembly in which a pressure difference or an air pressure is generated between mirror surface portions corresponding to the mirror surfaces of a molten molding material or molten resin and a vent hole portion corresponding to a vent hole in order to cause the molten molding material or molten resin to sink, a step is formed in a cavity between the vent hole and a mirror surface portion. When the molten molding material or molten resin is cooled, the step prevents the resin from contracting over the step and thereby guarantees adhesion of the portions of the molding material other than a surface expected to sink and the mold assembly. This prevents sinking from proceeding over the step and thereby confines it to a region delimited by the step.

(2) The step is provided on the surface of the molding facing the vent hole, so that the sinking region can be confined to such a surface.

(3) Two steps are formed in such a manner as to isolate the vent hole and the mirror surface portions, so that sinking is prevented from extending to the mirror surfaces.

(4) The step is formed to surround the vent hole in order to prevent air from turning around to the transfer surface portions. This allows sinking to be confined to the region delimited by the step and thereby prevents sinking from extending to the mirror surfaces.

(5) When the step is similar in configuration to the contour of the side of the molding facing the vent hole, the sinking region can be controlled in the same ratio as the sectional area of the molding. This makes the internal strain and surface accuracy of the molding uniform and therefore enhances the accuracy of the molding.

(6) The sinking region can be controlled both when the step or steps of the molding are implemented as projections and when they are implemented as recesses.

(7) The step or steps prevent air from reaching the mirror surface portions via the vent hole and thereby protects the mirror surface portions from sinking.

(8) The steps configured to face each other at opposite longitudinal edges of each mirror surface obstruct air coming in through the vent hole or any other portion of the mold assembly. This also surely protects the mirror portions from sinking.

(9) The steps are each configured to surround the associated mirror surface portion. This prevents air from reaching the mirror surfaces more positively and prevents the sinking of the mirror surface portions more positively.

(10) The steps are tapered in order to confine the sinking to the area delimited by the steps. In addition, the tapering of the steps enhances the parting ability of the molding from the mold assembly.

(11) The steps are provided with a triangular or an arcuate cross-section in order to enhance the parting ability of the molding and to facilitate the formation of steps in the mold assembly.

(12) In a method of forming a molding of the kind described, an air pressure is continuously generated via the vent hole even after the internal pressure of the molten resin in the cavity has dropped to zero so as to control the sinking region more positively.

Eleventh Embodiment

Figure 18:
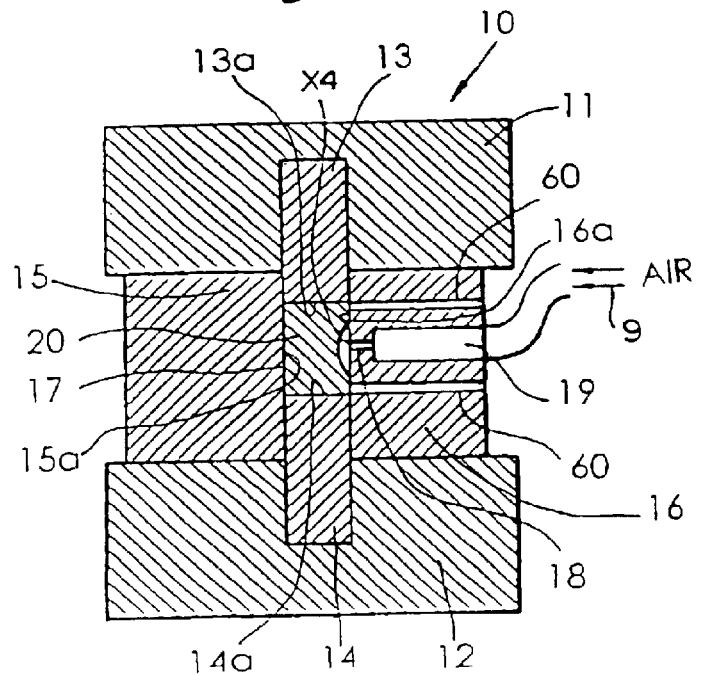
FIG. 18 is a cross-sectional view of an injection mold assembly representative of an eleventh embodiment of the present invention.

FIG. 18 shows an injection mold assembly 10 representative of an eleventh embodiment of the present invention.

As shown, a sink insert 16 is located at a position where sinking is expected to occur. The sink insert 16 is formed with a vent hole 18, a bore 19 communicating with the vent hole 18, and a pair of exhaust holes 60 positioned above and below the vent hole 18 and bore 19, respectively. FIG. 19 shows a positional relationship between the vent hole 18 and the exhaust holes 60.

In the illustrative embodiment, just after molten resin or molten molding material 20 has been injected into a cavity 17, it is difficult for air 9, fed under pressure via the vent hole 18 to enter the cavity 17. The internal pressure of the molten resin 20 sequentially decreases as the molten resin 20 is cooled. When the pressure of the molten resin 20 decreases below the pressure of the compressed air 9 delivered to the vent hole 18, the air 9 begins to flow into the cavity 17 via the vent hole 18. As a result, the portion of the molten resin 20 corresponding to one side (i.e., sink surface or B surface 24) of a molding 21, and facing the vent hole 18 begins to sink (see FIG. 18 at X4) away from the inner periphery of the cavity 17. The compressed air 9, introduced into the cavity 17 hits against the molten resin 20 and is then discharged from the cavity 17 via the exhaust holes 60. That is, the compressed air 9 is prevented from turning around to the upper mirror surface 22 and lower mirror surface 23 of the molding 21. If desired, a machine for forced exhaustion may be connected to the bore 19 in order to promote more effective discharge of the compressed air 9. When the mold assembly 10 is used to form, e.g., a lens of resin applicable to an image forming apparatus or similar optical apparatus, the exhaust holes 60 should be 0.001 mm to 0.5 mm wide (vertical dimension in FIG. 18). With such a width, the exhaust holes 60 allow a minimum of resin to enter it and thereby frees the molding 21 from burrs.

Twelfth Embodiment

FIG. 20 shows a mold assembly 10 representative of a twelfth embodiment of the present invention. As shown, this embodiment is identical with the eleventh embodiment except that the exhaust holes 60 are implemented by porous members 61.

Thirteenth Embodiment

FIG. 21 shows the position of an exhaust hole 60 formed in an injection mold assembly representative of a thirteenth embodiment of the present invention. As shown, a continuous exhaust hole 60 is formed to surround the vent hole 18. The exhaust hole 60 may also be implemented by the porous member 61 in order to simplify the configuration of the sink insert 16, FIG. 20.

Fourteenth Embodiment

FIG. 22 shows a fourteenth embodiment of the present invention which is a modification of the thirteenth embodiment. As shown, this embodiment is identical with the thirteenth embodiment except that an exhaust hole 60 has a similar configuration to the contour of the side of the molding 21 which is expected to sink. Again, the exhaust hole 60 may be implemented by the porous member 61 in order to simplify the configuration of the sink insert 16 as shown in, FIG. 20.

The eleventh to fourteenth embodiments, shown and described above have the following unprecedented advantages.

(1) At least one exhaust hole is formed in the vicinity of a vent hole used to feed air under pressure for causing sinking. The exhaust hole discharges air, which causes sinking to occur in the vicinity of the vent hole, to the outside of a mold assembly before it reaches portions expected to form mirror surfaces. Therefore, air is prevented from reaching portions other than the portion expected to sink, so that the shape of the mold assembly is surely transferred to the other portions of the molding.

(2) A single exhaust hole surrounds the vent hole and discharges air, which causes sinking to occur smoothly to the outside of the mold assembly. This guides air only to the portion of the molding expected to sink more positively.

(3) The exhaust hole or holes are implemented by a porous member. Therefore, particularly when a single exhaust hole surrounds the vent hole, the porous member, formed with the holes, is simple in structure.

(4) Air is forcibly discharged via the exhaust holes, so that air, which causes sinking to occur in the cavity can be discharged more smoothly.

(5) The exhaust hole has an opening width as small as 0.001 mm to 0.5 mm and prevents a molding material from entering it. This frees the resulting molding from burrs.

Fifteenth Embodiment

Figure 23A:
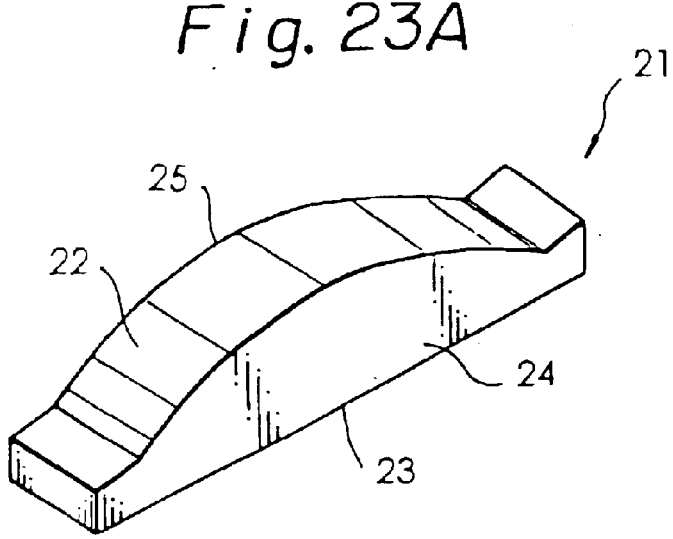
FIG. 23A is a perspective view of a plastic molding representative of a fifteenth embodiment of the present invention.
Figure 23B:
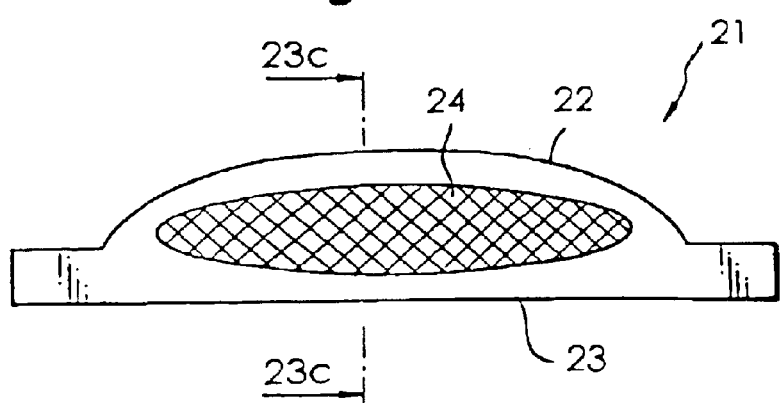
FIG. 23B is a side elevational view showing a sinking region to occur in the fifteenth embodiment.
Figure 23C:
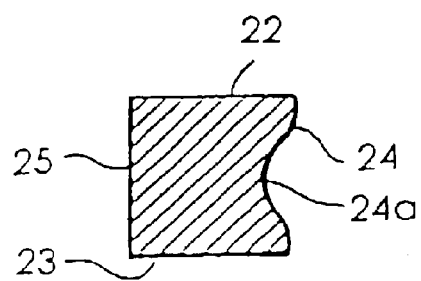
FIG. 23C is a cross-sectional view taken along line A—A of FIG. 23B.

FIGS. 23A–23C show a plastic molding formed by a method representative of a fifteenth embodiment of the present invention. The molding 21 may be implemented not only as a lens, but also as a mirror, prism or similar optical device. As shown, the molding 21 has mirror surfaces or transfer surfaces 22 and 23 on its top and bottom, respectively. In addition, the molding 21 has a reference surface or non-transfer surface or C surface 25 at one side and a sink surface or non-transfer surface or B surface 24 at the other side. The reference surface 25 is to be mounted to another part, while the sink surface 24 is expected to sink.

Reference will be made to FIGS. 24A, 24B, 25A and 25B for describing a mold assembly 10 for producing the above molding 21. As shown, the mold assembly 10 includes a stage 3 loaded with a lower mold 12. An upper mold 11 is positioned above the lower mold 12. The lower mold 12 is movable into and out of contact with the upper mold 11 by being driven by a clamping device (not shown).

A plurality of (four in the embodiment) inserts are interposed between the lower mold 12 and the upper mold 11 and constitute cavity inserts. Specifically, mirror inserts 13 and 14 facing each other are respectively formed with mirror surfaces 13a and 14a for forming the mirror surfaces 22 and 23 of the molding 21. A reference insert 15 and a sink insert 16 face each other at both sides of the mirror inserts 13 and 14 and are respectively formed with non-transfer surfaces 15a and 16a, respectively, in order to form the reference surface 25 and sink surface 24, respectively. The surfaces of the inserts 13–16 form a cavity 17. The non-transfer surfaces 15a and 16a are each formed with fine undulations 62.

Figure 24A:
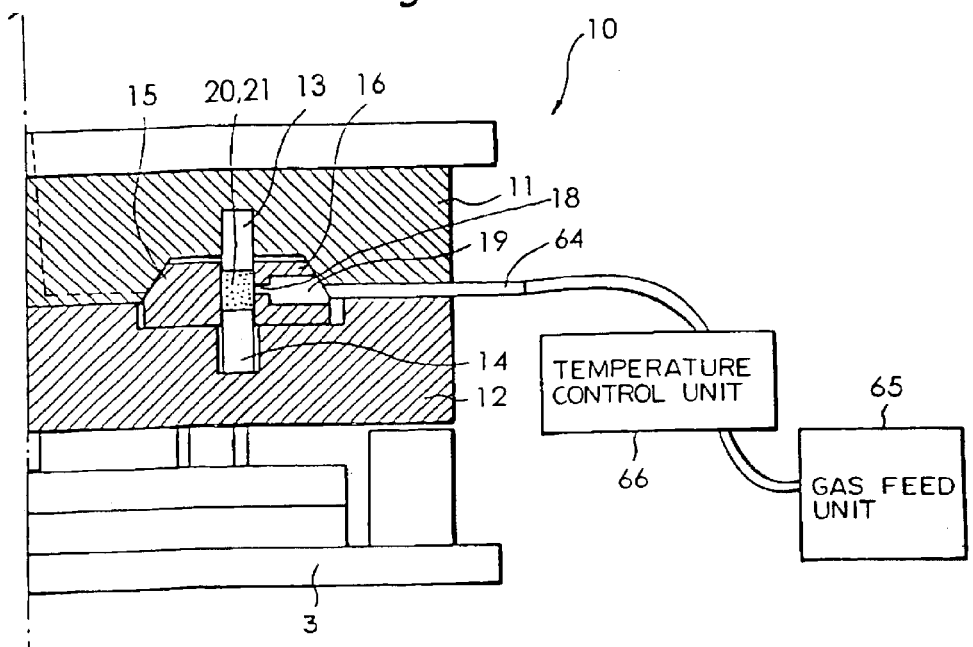
FIG. 24A is a cross-sectional view showing one half of the fifteenth embodiment.
Figure 24B:
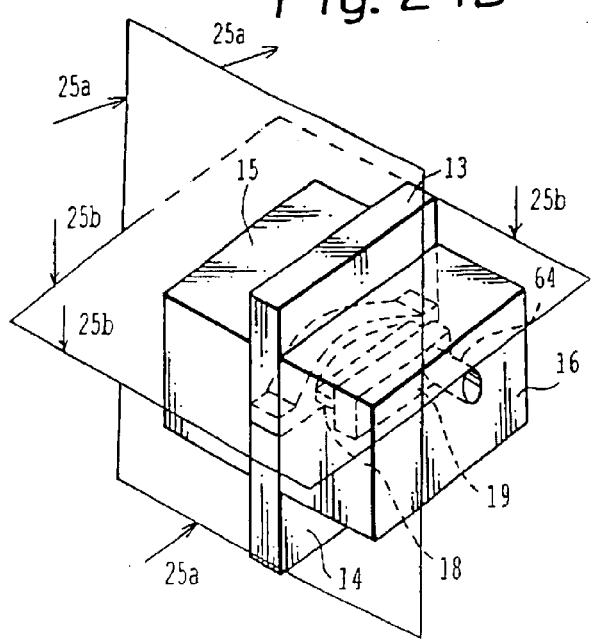
FIG. 24B is a perspective view showing cavity inserts included in the fifteenth embodiment.
Figure 25A:
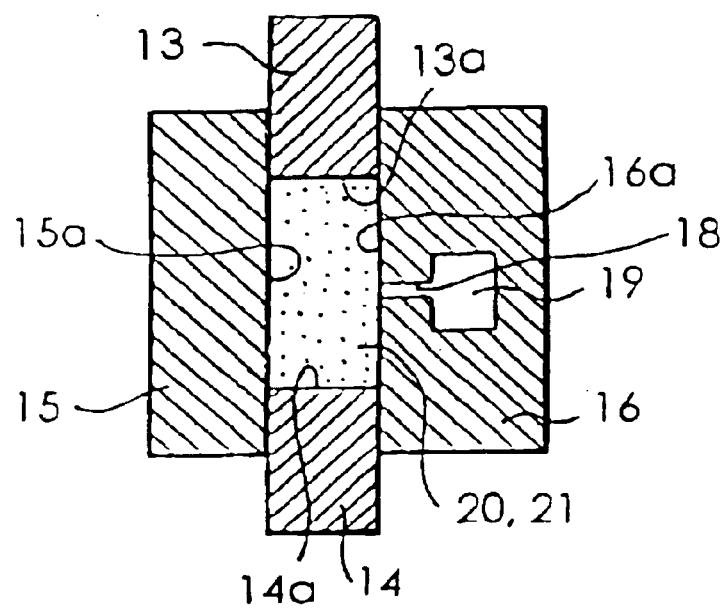
FIG. 25A is a cross-sectional view as seen in a direction X of FIG. 24B.
Figure 25B:
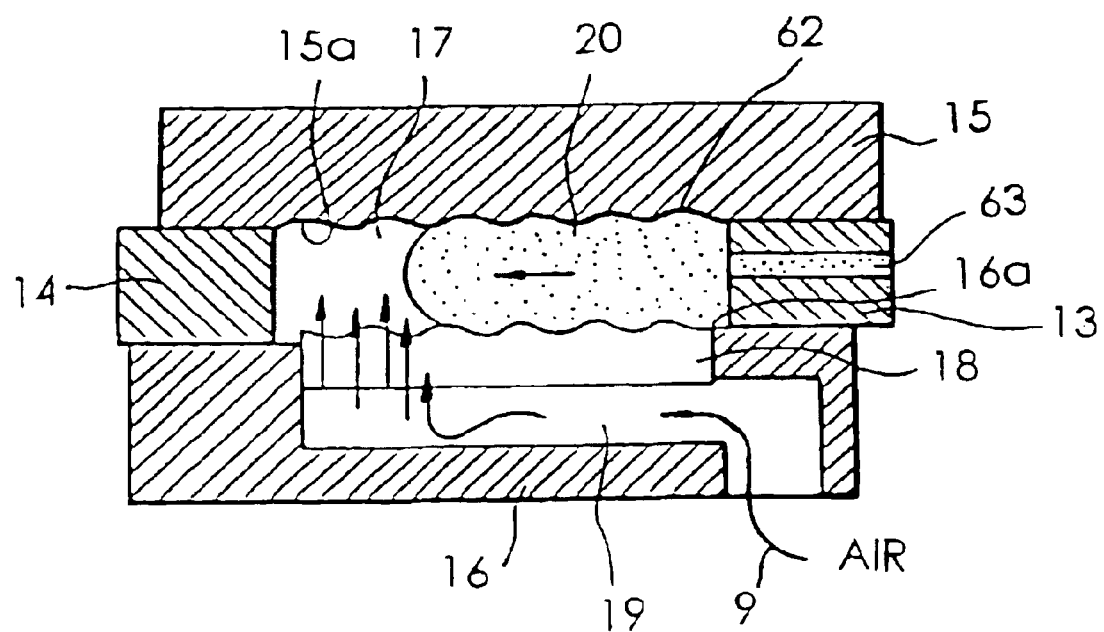
FIG. 25B is a cross-sectional view as seen in a direction Y of FIG. 24B.
Figure 26:
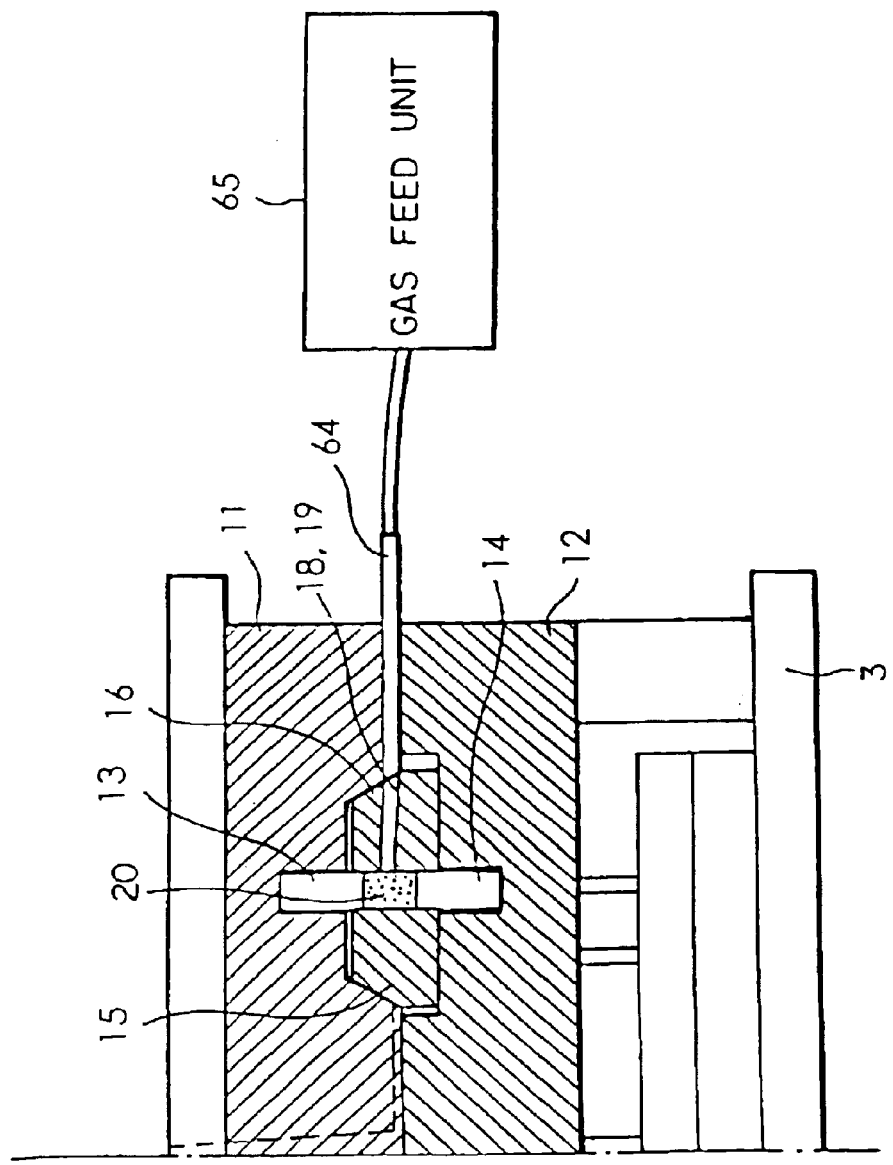
FIG. 26 is a cross-sectional view showing a method and an apparatus for producing a plastic molding representative of a sixteenth embodiment of the present invention.
Figure 27A:
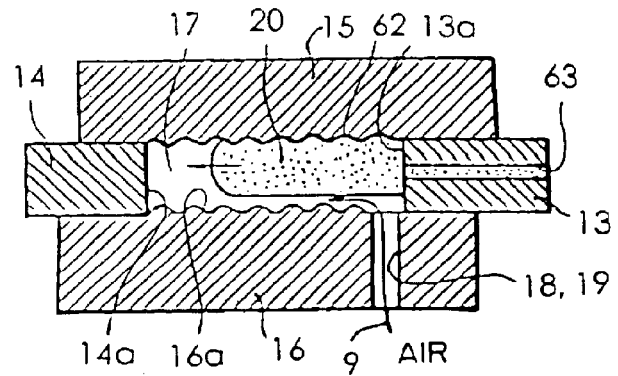
FIGS. 27A–27D show a specific procedure available with the sixteenth embodiment.
Figure 27B:
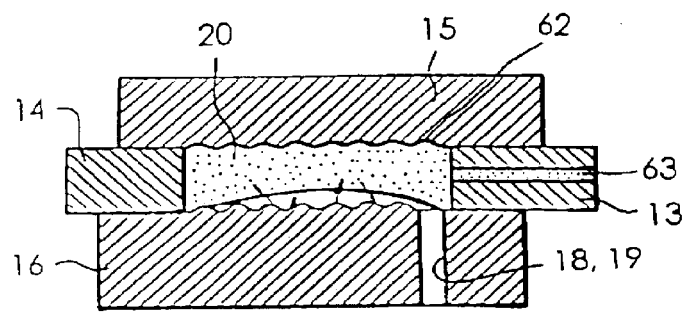
Figure 27C:
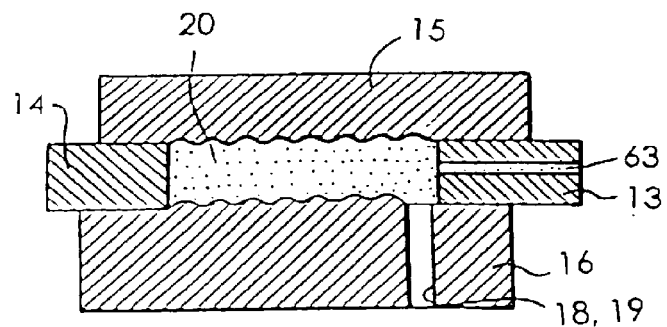
Figure 27D:
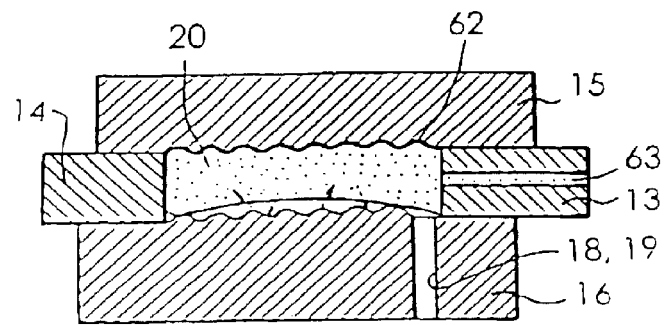
Figure 28A:
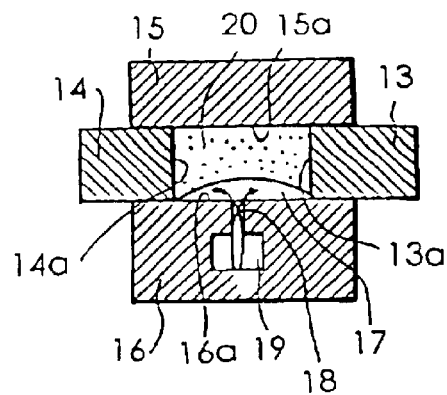
FIGS. 28A–28D show another specific procedure available with the sixteenth embodiment.
Figure 28B:
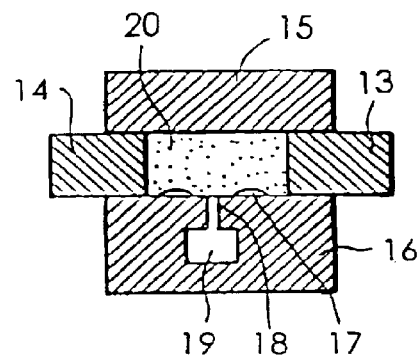
Figure 28C:
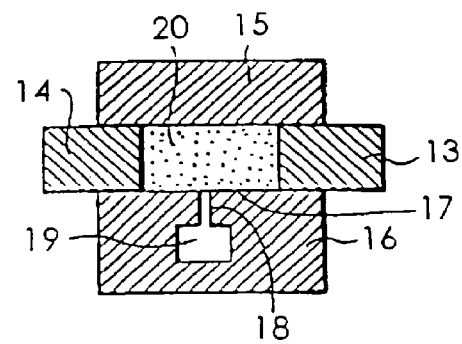
Figure 28D:
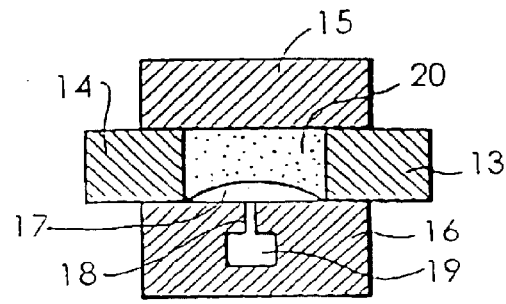

It is to be noted that FIGS. 24A and 24B show only one half of the mold assembly 10. The other half is also provided with cavity inserts identical with the cavity inserts 13–16. A gate or sprue (not shown) is formed in the upper mold 11 while a gate or sprue 63 is formed in the mirror insert 13 and communicable to the above sprue. An injection molding machine (not shown) feeds molten resin to the cavity 17 via the sprue of the upper mold 11 and sprue 63.

A vent hole 18 is formed in the sink insert 16. The vent hole 18 is open to the cavity 17 at one end and connected to a feed tube 64 at the other end. The feed tube 64 is interposed between the lower mold 12 and the upper mold 11 and connected to a gas feed unit 65 via a temperature control unit 66. A gas, e.g., air 9 compressed to a preselected pressure by the gas feed unit 65 and controlled to a preselected temperature by the temperature control unit 66 is fed via the feed tube 64.

In the illustrative embodiment, molten resin 20 heated above its softening point, is injected into the cavity 17 of the mold assembly 10 heated to a temperature lower than the softening point of the resin. Therefore, the temperature control unit 66 controls the gas to a temperature about 3° C. lower than the temperature of the mirror inserts 13 and 14 and reference insert 15. It follows that the temperature of the gas, fed from the feed tube 64 to the sink surface 16, is lower than the temperature of the mirror surfaces 22 and 23 and reference surface 25. The lower mold 12 and upper mold 11 surrounding the inserts 13–16 are each provided with a temperature control mechanism including a heater and an oil cooler (not shown). The heater and oil cooler respectively heat and cool the associated molds 11 and 12 and therefore the inserts 13–16.

In the illustrative embodiment, the temperature control unit 66 and gas feed unit 65 constitute a feeding device, and also constitute gas feeding means in combination with the vent hole 18.

The operation of the above described arrangement will be discussed hereinafter. When a lens or similar plastic optical element is produced by conventional injection molding, molding conditions allowing the entire area to be transferred (allowing the internal pressure of the molding to drop substantially to zero at the time of take-out) are set up. However, because molten resin is sharply cooled as soon as it is introduced into a mold, the resulting temperature distribution, pressure distribution, density distribution and so forth disturb the shape of a molding. This, coupled with the internal strain (deflection) of the resin, adversely influences the optical characteristic of the molding. Although the transfer of the mold configuration, internal strain and deformation may be reduced if a molding is caused to partly sink, it is extremely difficult to specify the part of a molding to sink. This embodiment is significant in that it can specify the part of a molding to sink, as follows.

While the mold assembly 10 is held at a temperature lower than the softening point of resin, molten resin 20 heated above its softening points is injected into the cavity 17. Then, a resin pressure is caused to act on the transfer surfaces 13a and 14a of the mirror inserts 13 and 14, respectively. At the same time as the injection of the molten resin 20, a cool gas, compressed to a preselected pressure by the air feed unit 65 and controlled to a preselected temperature by the temperature control unit 66, is fed to the sink surface or B surface 24 via the vent hole 18. The feed of the gas, such as air, is continued until the resin 20 has been fully injected into the cavity 17. At this instant, the sink surface or B surface 24, lower in temperature than the mirror surfaces 22 and 23 solidifies first and increases its viscosity. This makes it difficult for the sink surface or B surface 24 to remain in contact with the non-transfer surface 16a of the sink insert 16 before the end of the injection of the molten resin 20. After the injection of the molten resin 20 and the subsequent stop of the feeding of the cool gas, such as air, the cavity 17 is caused to dwell at a preselected pressure and cooled. As soon as the pressure inside the cavity 17 drops substantially to zero, the upper mold 11 is opened away from the lower mold 12. Subsequently, the molding 21 is taken out of the cavity 17.

The sink surface or B surface 24 of the molding 21 obtains a parting ability earlier than the other surfaces of the molding 21. As a result, the sink surface or B surface 24 begins to sink earlier than the other surfaces contacting the inserts 13–15. This successfully prevents the mirror surfaces 22 and 23 from sinking and thereby allows the desired mirror surfaces 22 and 23 to be faithfully transferred to the molding 21 in a short molding cycle.

Moreover, the sink surface or B surface 24 is held at a temperature lower than the temperature of the molten resin 20 from the end of the resin injection to the beginning of cooling. Consequently, a temperature difference does not occur between the mirror surfaces 22 and 23 and the sink surface or B surface 24 during cooling, so that an internal strain is prevented from remaining in the molding 21 after the opening of the mold assembly. This not only prevents the accuracy of the mirror surfaces 22 and 23 from decreasing, but also prevents the entire molding 21 from deforming.

In addition, the gas feeding means can be implemented only if the vent hole 18 is formed in the sink insert 16 and connected to both the temperature control unit 66 and gas feed unit 65. The mold assembly 10 is therefore simple in construction.

Sixteenth Embodiment

Referring to FIGS. 26, 27A–27D, and 28A–28D, a method and an apparatus for producing a plastic molding 21 representative of a sixteenth embodiment of the present invention will be described. A molding 21 to be produced by this embodiment is identical in configuration with the molding 21 of the fifteenth embodiment and will be described with reference to FIGS. 23A–23C. Structural elements identical with the elements of the fifteenth embodiment are designated by identical reference numerals and will not be described specifically in order to avoid redundancy.

As shown in FIGS. 26 and 27A–27D, a plurality of (four in the embodiment) inserts are interposed between the lower mold 12 and the upper mold 11 and constitute cavity inserts. Specifically, mirror inserts 13 and 14 face each other and are respectively formed with transfer surfaces 13a and 14a for forming the mirror surfaces 22 and 23 of a molding 21. A reference insert 15 and a sink insert 16 face each other at both sides of the mirror inserts 13 and 14 and are formed with non-transfer surfaces 15a and 16a, respectively, in order to form the reference surface or C surface 25 and sink surface or B surface 24 of the molding 21. The surfaces of the inserts 13–16 form a cavity 17. The non-transfer surfaces 15a and 16a are each formed with fine irregularities or undulations 62.

A gate or sprue (not shown) is formed in the upper mold 11 while a sprue 63 is formed in the mirror insert 13 and communicates with the gate or sprue. An injection molding machine (not shown) injects molten resin into the cavity 17 via the gate or sprue of the upper mold 11 and gate or sprue 63. A vent hole 18 is formed in the sink insert 16. The vent hole 18 is open to the cavity 17 at one end and connected to a feed tube 64 at the other end. The feed tube 64 is interposed between the lower mold 12 and the upper mold 11.

The feed tube 64 is connected to a gas feed unit 65. The gas feed unit 65 feeds a gas, e.g., air 9 compressed to a preselected pressure, to between the sink surface 24 and the transfer surface 16a via the feed tube 64 and vent hole 18. In this embodiment, the gas feed unit 65 constitutes a feeding device and constitutes gas feeding means in combination with the vent hole 18 and feed tube 64.

The operation of the illustrative embodiment will be described with reference to FIGS. 27A–27D. As shown, while the mold assembly 10 is held at a temperature lower than the softening point of resin, molten resin 20 heated above its softening point is injected into the cavity 17. Then, a resin pressure is caused to act on the transfer surfaces 13a and 14a of the mirror inserts 13 and 14, respectively. At the same time as the injection of the molten resin 20, a gas compressed to a preselected pressure by the air feed unit 65 is fed to between the sink surface 24 and the non-transfer transfer surface 16a. The feed of the gas is continued until the molten resin 20 has been fully injected into the cavity 17 (see FIGS.-27A and 27B). At this instant, a gas layer is formed between the non-transfer surface 16a and the sink surface 24, making it difficult for the sink surface 24 to remain in contact with the non-transfer surface 16a before the end of the injection of the molten resin 20.

After the injection of the molten resin 20 and the following stop of feed of the gas, e.g., air, the cavity 17 is caused to dwell at a preselected pressure and cooled. As a result, the gas layer between the sink surface 24 and the non-transfer surface 16a is compressed by the internal pressure of the molten resin 20, but remains between them (see FIG. 27C). Such residual gas expands as the internal pressure approaches zero, separating the sink surface 24 of the molding 21 from the non-transfer surface 6 of the sink inset 16 of the mold assembly 10. When the internal pressure reaches zero, the non-transfer surface 16a obtains a parting ability earlier than the other surfaces of the mold assembly 10. When the pressure inside the cavity 17 drops substantially to zero, the upper mold 11 is released from the lower mold 12. Subsequently, the molding 21 is taken out of the cavity 17.

In this manner, the sink surface 24 begins to sink earlier than the other surfaces contacting the inserts 13–15. This successfully prevents the mirror surfaces 22 and 23 from sinking and thereby allows the desired mirror surfaces 22 and 23 to be faithfully transferred to the molding 21 in a short molding cycle. Moreover, the gas layer remains between the sink surface 24 and the non-transfer surface 16a until the cooling step begins after the injection of the molten resin, preventing the pressure difference, between the mirror surfaces 22 and 23 and the sink surface 24, from increasing during cooling. Consequently, the internal strain of the molding 21 is prevented from remaining after the opening of the mold assembly 10. This not only prevents the accuracy of the mirror surfaces 22 and 23 from decreasing, but also prevents the entire molding 21 from deforming.

This embodiment may be practiced with the same configuration as the fifteenth embodiment, as follows. The gas fed from the gas feed unit 65 is controlled to substantially the same temperature as the mold assembly 10 by the temperature control unit 66, shown in FIG. 24. In this case, as shown in FIGS. 28A–28D, while the mold assembly 10 is held at a temperature lower than the softening point of resin, molten resin 20 heated above its softening point is injected into the cavity 17. Then, a resin pressure is caused to act on the transfer surfaces 13a and 14a of the mirror inserts 13 and 14, respectively. At the same time as the injection of the molten resin 20, the gas compressed to a preselected pressure by the gas feed unit 65 is fed to between the sink surface 24 and the non-transfer surface 16a. The feed of the gas, e.g., air, is continued until the molten resin 20 has been fully injected into the cavity 17 (see FIGS. 28A and 28B). At this instant, a gas layer is formed between the non-transfer surface 16a and the sink surface 24, making it difficult for the sink surface 24 to remain in contact with the non-transfer surface 16a before the end of the injection of the molten resin 20.

After the injection of the molten resin 20 and the following stop of feed of the gas, the cavity 17 is caused to dwell at a preselected pressure and cooled. As a result, the gas layers between the sink surface 24 and the non-transfer surface 16a, is compressed by the internal pressure of the molten resin 20, but remains between them (see FIG. 28C). The residual gas expands as the internal pressure approaches zero, separating the sink surface 24 from the-non-transfer surface 16a. When the internal pressure reaches zero, the non-transfer surface 16a obtains a parting ability earlier than the other surfaces of the mold assembly 10 (see FIG. 28D). When the pressure inside the cavity 17 drops substantially to zero, the upper mold 11 is released from the lower mold 12. Subsequently, the molding 21 is taken out of the cavity 17.

Seventeenth Embodiment

A method and an apparatus for producing a plastic molding 21 representative of a seventeenth embodiment of the present invention will be described with reference to FIGS. 29, 30A and 30B. A molding 21 to be produced by this embodiment is identical in configuration with the molding 21 of the fifteenth embodiment and will be described with reference to FIGS. 23A–23C. Structural elements identical with the elements of the fifteenth embodiment will be designated by identical reference numerals and will not be described specifically in order to avoid redundancy.

Figure 29:
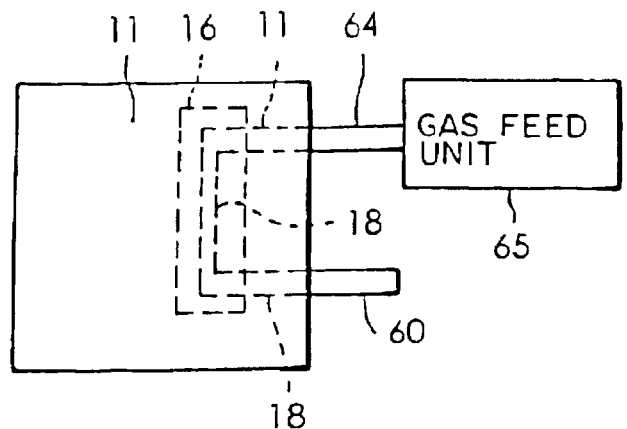
FIG. 29 is a top plan view showing a method and an apparatus for producing a plastic molding representative of a seventeenth embodiment of the present invention.
Figure 30A:
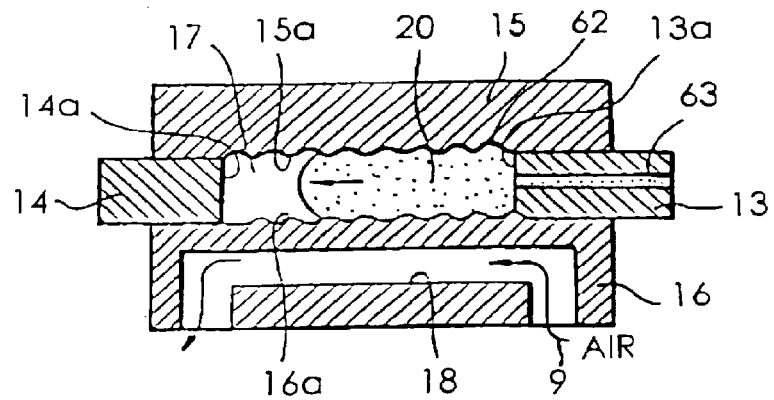
FIGS. 30A and 30B show another specific procedure available with the seventeenth embodiment.
Figure 30B:
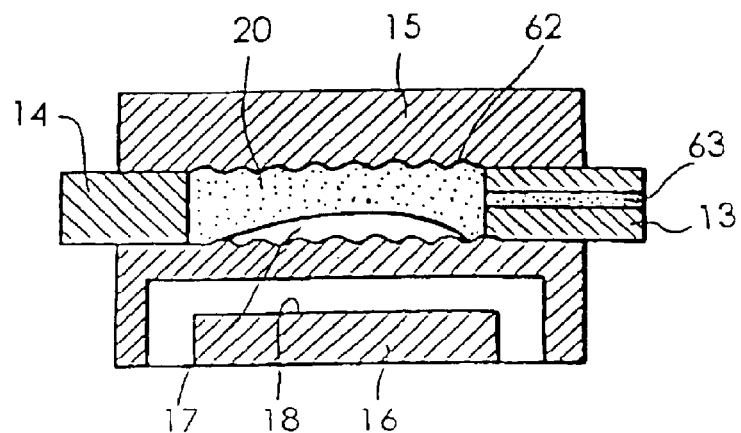
Figure 32A:
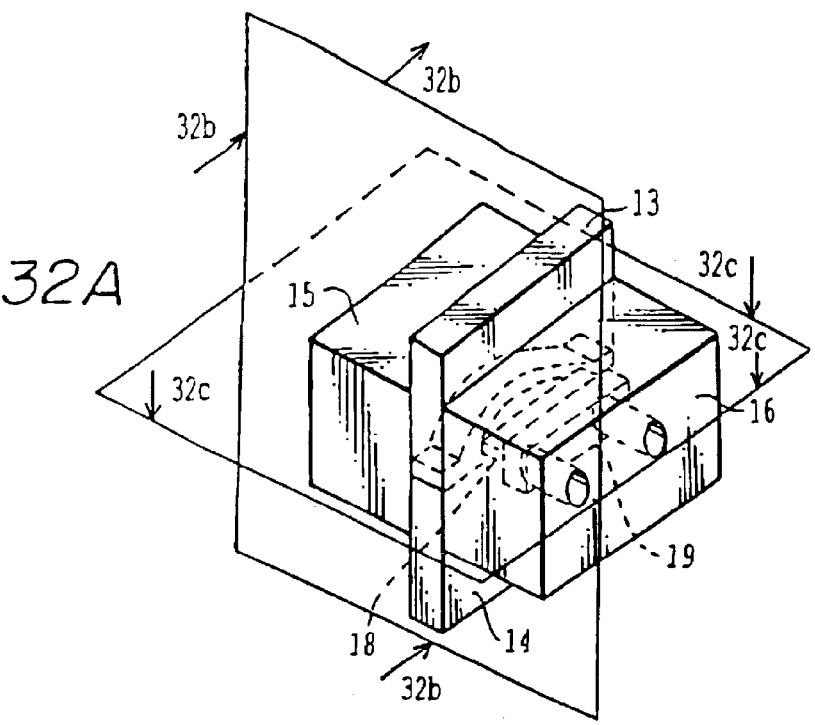
FIG. 32A is a perspective view showing cavity inserts included in the eighteenth embodiment.
Figure 32B:
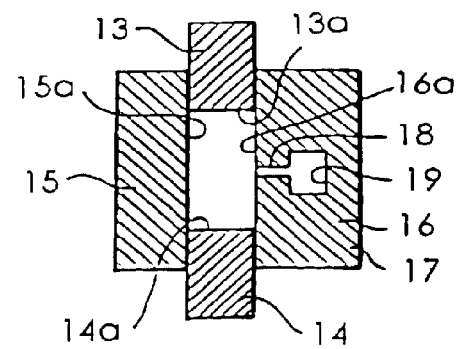
FIG. 32B is a cross-sectional view as seen in a direction X of FIG. 32A.
Figure 32C:
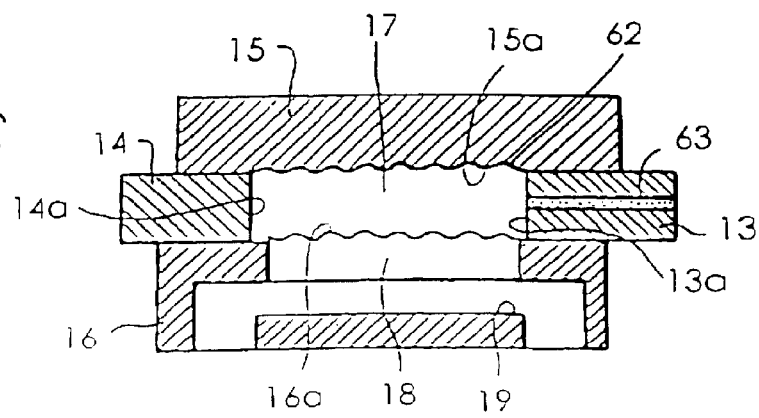
FIG. 32C is a cross-sectional view as seen in a direction Y of FIG. 32A.

As shown in FIGS. 29, 30A, and 30B, a plurality of (four in the embodiment) inserts are interposed between the lower mold 12 and the upper mold 11 and constitute cavity inserts. Specifically, mirror inserts 13 and 14 facing each other are respectively formed with mirror surfaces 13a and 14a for forming the mirror surfaces 22 and 23 of a molding 21. A reference insert 15 and a sink insert 16 face each other at both sides of the mirror inserts 13 and 14 and are respectively formed with non-transfer surfaces 15a and 16a in order to form the reference surface 25 and sink surface 24 of the molding 21. The surfaces of the inserts 13–16 form a cavity 17. The non-transfer surfaces 15a and 16a each is formed with fine irregularities or undulations 62.

An injection molding machine (not shown) injects molten resin into the cavity 17 via a gate or sprue (not shown) of the upper mold 11 and a gate or sprue 63 in sink insert 16. A vent hole 18 is formed in the sink insert 16. One end of the vent hole 18 is communicates with a gas feed unit 65 via a vent hole 18 formed in the lower mold 12 and a feed tube 64. The other end of the vent hole 18 is communicated to the outside of the mold assembly via a exhaust tube 60.

The gas feed unit 65 feeds gas, e.g., air 9 controlled to a preselected pressure and a preselected temperature to the vent hole 18 via the feed tube 64 and vent hole 18, and then discharges it via the vent hole 18 and exhaust tube 60. The gas therefore cools the non-transfer surface 16a of the sink insert 16.

In the illustrative embodiment, molten resin 20 heated above its softening point is injected into the cavity 17 of the mold assembly 10 heated to a temperature lower than the softening point of the resin. Therefore, a temperature control unit 66 controls the temperature of the gas to a temperature about 3° C. lower than the temperature of the mirror inserts 13 and 14 and reference insert 15. It follows that the temperature of the gas fed from the vent hole 18 to the sink surface 24 is lower than the temperature of the transfer surfaces 13a and 14a and non-transfer surface 15a.

In this embodiment, the gas feed unit 65, feed tube 64, vent holes 18 and exhaust tube 60 constitute cooling means.

In operation, before the injection of molten resin 20, a cool gas, e.g., air 9, controlled to a preselected pressure and a preselected temperature is fed from the gas feed unit 65 to the non-transfer surface 16a via the vent hole 18 so as to cool the non-transfer surface 16a. Then, while the mold assembly 10 is held at a temperature lower than the softening point of resin, molten resin 20 heated above its softening point is injected into the cavity 17. Subsequently, a resin pressure is caused to act on the transfer surfaces 13a and 14a of the mirror inserts 13 and 14, respectively. The feed of the cool gas, e.g., air 9 is continued until the resin 20 has been fully injected into the cavity 17. At this instant, the sink surface 24 lower in temperature than the mirror surfaces 22 and 23 solidifies first and increases its viscosity, making it difficult for the sink surface 24 to remain in contact with the non-transfer surface 16a before the end of the injection of the resin 20. After the injection of the molten resin and the following stop of feed of the cool gas, the cavity 17 is caused to dwell at a preselected pressure and cooled. When the pressure inside the cavity 17 drops substantially to zero, the upper mold 11 is released from the lower mold 12. Subsequently, the molding 21 is taken out of the cavity 17. This embodiment achieves the same advantages as the fifteenth embodiment.

Eighteenth Embodiment

A method and an apparatus for producing a plastic molding 21 representative of a seventeenth embodiment of the present invention will be described with reference to FIGS. 31, 32A–32C, 33A, 33B, 34A–34C and 35. A molding 21 to be produced by this embodiment is identical in configuration with the molding 21 of the fifteenth embodiment and will be described with reference to FIGS. 23A–23C. Structural elements identical with the elements of the fifteenth embodiment will be designated by identical reference numerals and will not be described specifically in order to avoid redundancy.

As shown, a plurality of (four in the embodiment) inserts are interposed between the lower mold 12 and the upper mold 11 and constitute cavity inserts. Specifically, mirror inserts 13 and 14 facing each other are respectively formed with mirror surfaces 13a and 14a for forming the mirror surfaces 22 and 23 of a molding 21. A reference insert 15 and a sink insert 16 face each other at both sides of the mirror inserts 13 and 14 and are respectively formed with non-transfer surfaces 15a and 16a in order to form the reference surface 25 and sink surface 24. The surfaces of the inserts 13–16 form a cavity 17. The non-transfer surfaces 15a and 16a each is formed with fine irregularities or undulations 62.

A gate or sprue (not shown) is formed in the upper mold 11 while a gate or sprue 63 is formed in the mirror insert 13 and communicable to the gate or sprue (not shown) in the upper mold 11. An injection molding machine, not shown, injects molten resin into the cavity 17 via the gate or sprue of the upper mold 11 and the gate or sprue 63. A vent hole 18 is formed in the sink insert 16. The vent hole 18 is open to the cavity 17 at one end and connected to a bore 19 at the other end. The bore 19 is communicated to a flow rate control unit 67 via a vent hole 18 formed in the lower mold 12 and a feed tube 64. The flow rate control unit 67 is connected to a gas feed unit 65 via both a pressure control unit 68 and a temperature control unit 66.

The gas feed unit 66 constitutes a gas source. The temperature control unit 65 controls the temperature of a gas fed from the gas feed unit 66. The pressure control unit 68 controls the pressure of the gas fed from the gas feed unit 66. Further, the flow rate control unit 67 controls the flow rate of the gas fed from the gas feed unit 66. The vent hole 18 is communicated with an exhaust valve 69 via a vent hole 18 formed in the lower mold 12 and an exhaust tube 60. The gas fed from the gas feed unit 66 to the vent hole 18 is discharged to the outside when the exhaust valve 69 is open, or introduced into the cavity 17 when the valve 69 is closed.

In this embodiment, the flow rate control unit 67, pressure control unit 68, temperature control unit 66 and gas feed unit 65 constitute a feeding device. The feeding device constitutes gas feeding means in combination with the vent holes 18, feed tube 64, and exhaust valve 69.

The operation of the illustrative embodiment will be described with reference to FIGS. 33A, 33B and 34A–34C. Briefly, this embodiment is characterized in that a step of pressing the sink surface 24 of molten material with the gas is combined with at least one of a step of lowering the temperature of the sink surface 24 below the temperature of the mirror surfaces 22 and 23, a step of forming a gas layer between the sink surface 24 and the sink insert 16, and a step of lowering the temperature of the sink insert 16 facing the sink surface 24 below the temperature of the mirror inserts 13 and 14. The following description will concentrate on the combination of all of such steps.

Figure 33A:
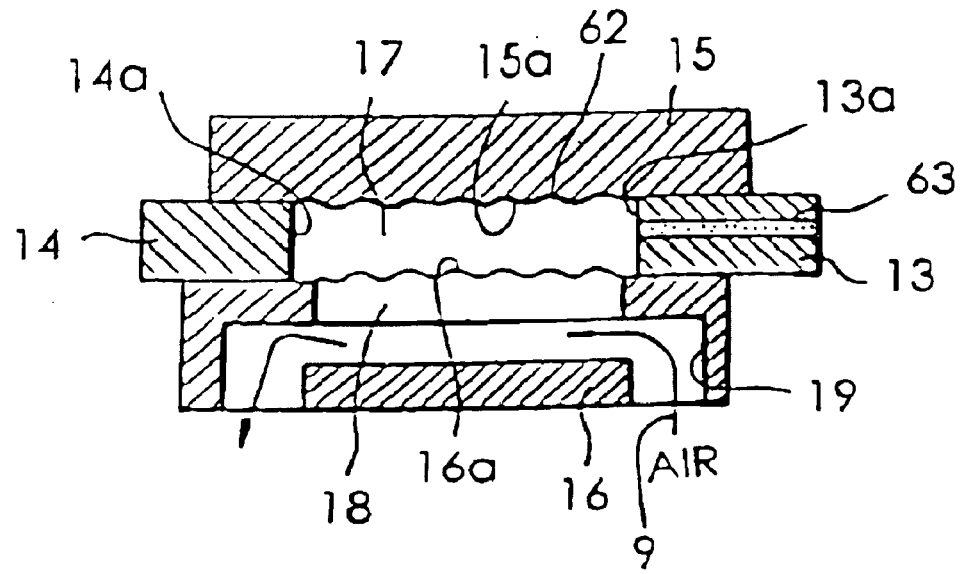
FIGS. 33A and 33B show another specific procedure available with the eighteenth embodiment.
Figure 33B:
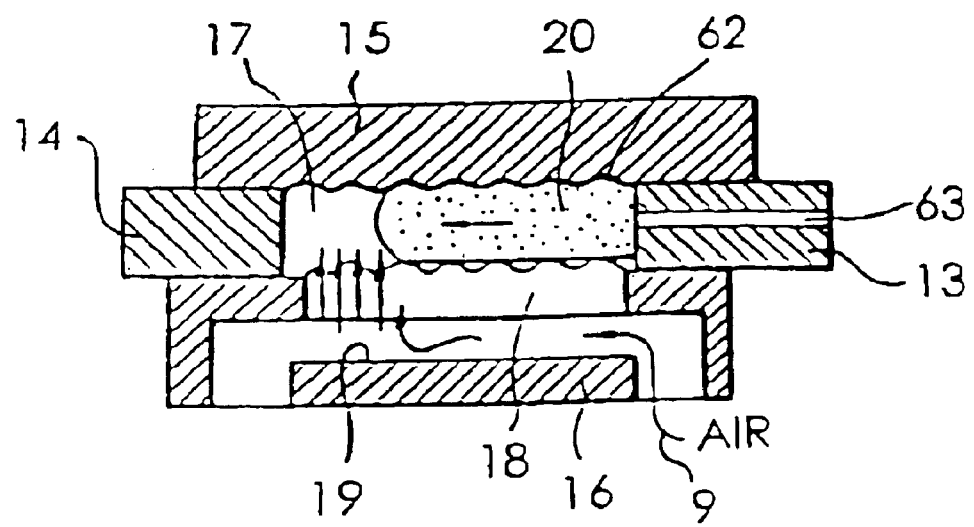
Figure 34A:
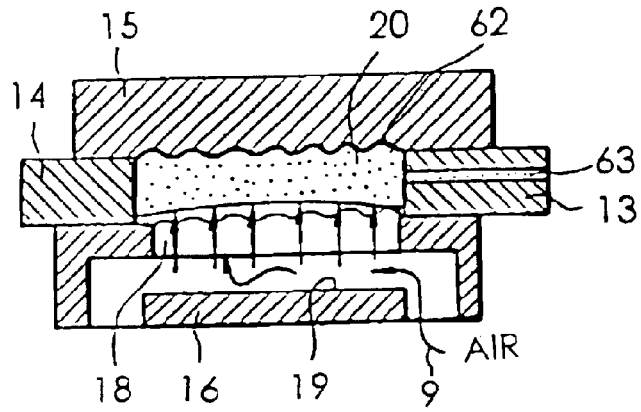
FIGS. 34A–34C show a procedure following the procedure of FIG. 32B.
Figure 34B:
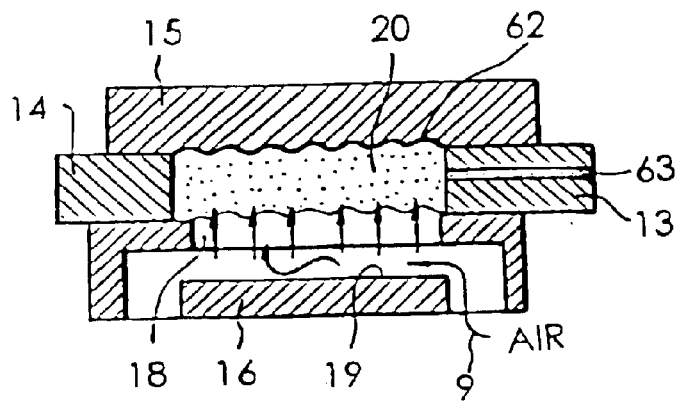
Figure 34C:
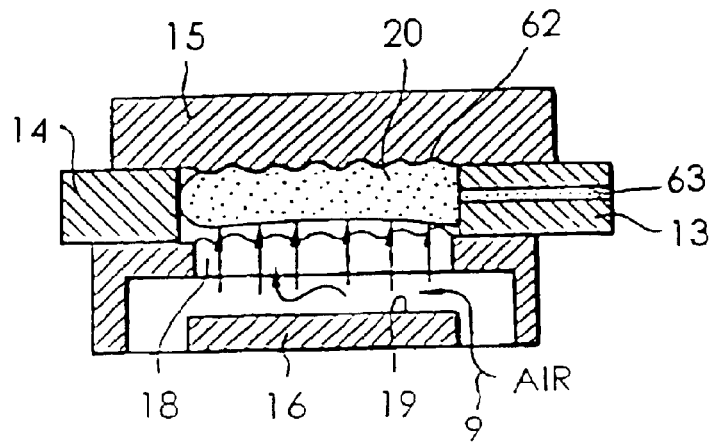

First, the exhaust valve 69 is opened to feed a small amount of gas, e.g., air 9, to the vent hole 18 via the flow rate control unit 67, thereby cooling the sink insert 16 (see FIG. 33A). Specifically, the flow rate of the gas, e.g., air 9, is selected so as to prevent the gas from entering the cavity 17. Otherwise, the gas, e.g., air, would enter the cavity 17 and cool even the mirror surfaces 13 and 14. If desired, the temperature of the gas may be controlled in order to promote the effective cooling of the sink insert 16.

After the mold assembly 10 has been heated to a temperature lower than the softening point of resin, but before molten resin 20, heated to a temperature above its softening point is injected into the cavity 17, the flow rate and pressure of the gas are increased by the flow rate control unit 67 and pressure control unit 68, respectively. As a result, the gas, e.g., air, is admitted into the cavity 17. Subsequently, the molten resin 20 begins to be injected into the cavity 17 (see FIG. 33B). The increase in the flow rate of the gas, e.g., air, promotes the cooling of the molten resin 20 while the increase in the pressure of the gas allows the gas to press the sink surface or B surface 24 of the molding 21 and allows a gas layer to be formed between the sink surface or B surface 24 of the molding 21 and the sink insert 16.

After the injection of the molten resin 20 (see FIG. 34A), the exhaust valve 69 is closed, while the pressure of the gas, e.g., air, is adequately controlled by the pressure control unit 68. As a result, the cavity 17 is caused to dwell at a preselected pressure and cooled (see FIGS. 34B and 34C). When the pressure inside the cavity 17 drops substantially to zero, the upper mold 11 is released from the lower mold 12. Thereafter, the molding 21 is taken out of the cavity 17.

This embodiment achieves the same advantages as the fifteenth embodiment, and in addition achieves an advantage that the sink surface or B surface 24 of the molding 21 is constantly pressed and therefore easily separates from the sink insert 16. This allows the sink surface or B surface 24 of the molding 21 to sink more positively.

Figure 35:
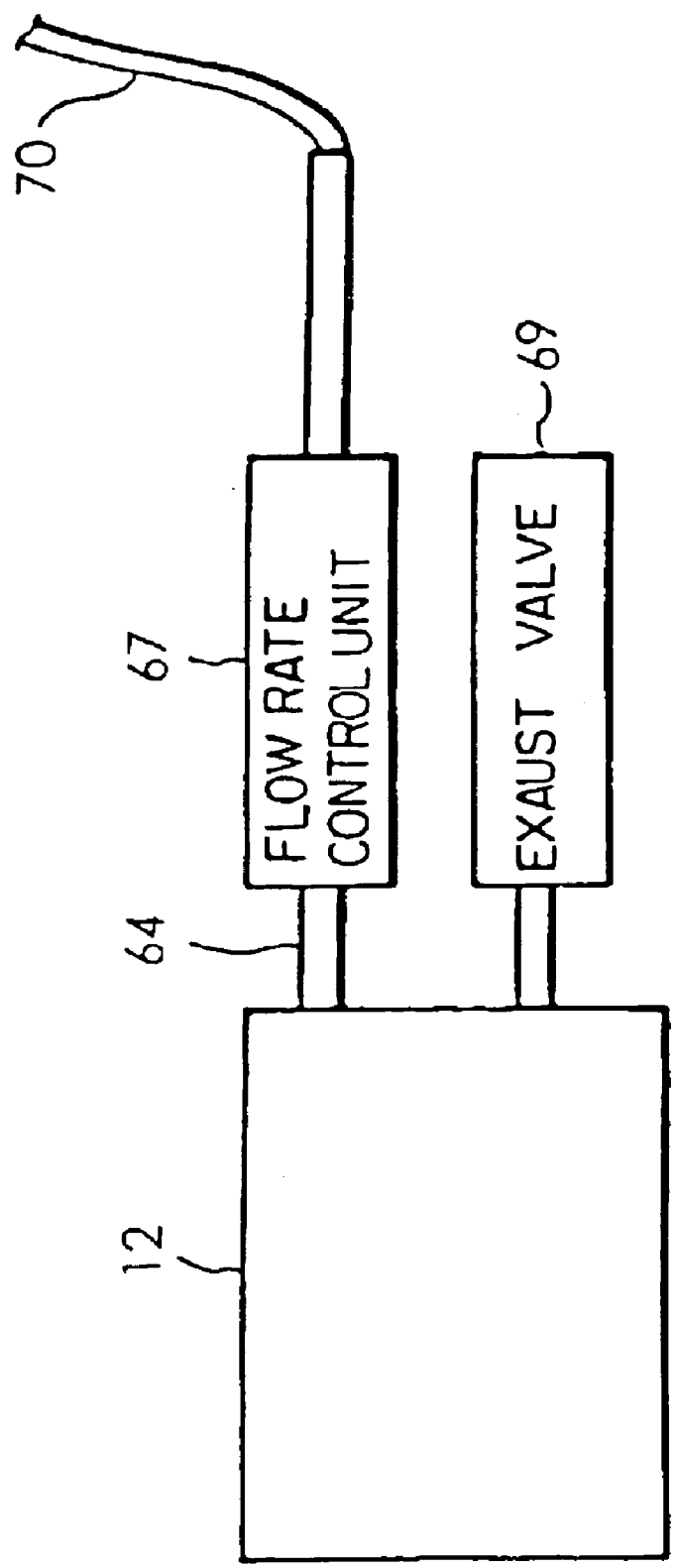
FIG. 35 shows a modification of the eighteenth embodiment.

FIG. 35 shows an alternative arrangement wherein the flow control unit 67 is connected to a gas conduitwork 70 available in a factory.

Constantly pressing the sink surface 24, as shown and described, is not essential. Alternatively, at least one of three different methods may be used, as follows: lowering the temperature of at least one of the non-transfer surfaces of the molten resin below the temperature of the transfer surfaces from the beginning to the end of the injection of the molten resin; forming a gas layer between at least one of the non-transfer surfaces of the molten resin and the mold assembly; and lowering the temperature of the mold portion facing at least one of the non-transfer surfaces of the molten resin below the temperature of the mold portion facing the transfer surfaces.

The fifteenth to eighteenth embodiments, shown and described above have the following unprecedented advantages;

(1) The non-transfer surface of a molding obtains a parting ability earlier than the other surfaces of the same. This successfully prevents the transfer surfaces of the molding from sinking and thereby allows desired mirror surfaces to be faithfully transferred to the molding in a short molding cycle.

(2) The non-transfer surface of molten resin is held at a temperature lower than the temperature of the transfer surfaces from the end of resin injection to the beginning of cooling. Consequently, a temperature difference does not occur between the transfer surfaces and the non-transfer surfaces during cooling, so that an internal strain is prevented from remaining in the molding after the opening of a mold assembly. This not only prevents the accuracy of the transfer surfaces from decreasing, but also prevents the entire molding from deforming.

(3) A gas layer is formed between the non-transfer surface of the resin and the mold assembly until the cooling step begins after the injection of the molten resin, preventing the pressure difference between the transfer surfaces and the non-transfer surface from increasing during cooling. Consequently, the internal strain of the molding is prevented from remaining after the opening of the mold assembly. This not only prevents the accuracy of the transfer surfaces from decreasing, but also prevents the entire molding from deforming.

(4) The gas layer is formed between the non-transfer surfaces of the resin and the mold assembly, and/or the temperature of the non-transfer surface is held lower than the temperature of the transfer surface until the cooling step begins after the injection of the molten resin, thereby preventing a difference in temperature or pressure between the transfer surface and the non-transfer surface from increasing during cooling. Consequently, the internal strain of the molding is prevented from remaining after the opening of the mold assembly. This not only prevents the accuracy of the transfer surfaces from decreasing, but also prevents the entire molding from deforming.

(5) The temperature of the non-transfer surface of the resin is lowered, the non-transfer surface is pressed, and/or the gas layer is formed between the non-transfer surfaces of the resin and the mold assembly. This allows the non-transfer surface to sink with priority by use of a simple construction.

(6) Gas feeding means can be implemented only if a vent hole is formed in the mold assembly, and it communicates with a feeding device. This prevents the configuration of the mold assembly from being complicated.

(7) By cooling the non-transfer surface of the mold assembly with cooling means, it is possible to cool the non-transfer surface of the resin. The non-transfer surface can therefore be caused to sink by an inexpensive construction of the mold assembly.

Various modifications will become possible for those skilled in the art after receiving the teachings of the present disclosure without departing from the scope thereof. For example, while the embodiments have concentrated on a molding in the form of a rectangular lens (having two mirror surfaces or optical surfaces), the present invention is similarly applicable to, e.g., a mirror having a single mirror surface or a prism having a plurality of mirror surfaces.

What is claimed is:

1. In an injection molding method for producing a molding comprising the steps of:

providing a mold assembly having a pair of molds including a mold surface forming a cavity having a preselected volume, at least one transfer surface for transferring a mirror surface formed by said mold surfaces to said molding, at least one non-transfer surface, and a gate for filling said cavity with a molten material by injection;

injecting said molten material into said cavity via said gate and then cooling said molten material;

providing at least one vent hole having a preselected opening area and at least one bore communicated to said vent hole in said at least one non-transfer surface for applying a preselected air pressure to said molding material; and continuously applying the air pressure via said vent hole even after a pressure of said molding material in said cavity has dropped to zero thereby causing said molten material to sink away from said vent hole; and providing a at least one step in said at least one non-transfer surface between said vent hole and said at least one transfer surface to prevent sinking of the molten material from proceeding from said at least one non-transfer surface to said at least one transfer surface.

2. A method as claimed in claim 1, wherein the step of applying an air pressure comprises generating either a pressure difference or an air pressure between said transfer surface and a vent hole portion of the molding facing said vent hole.

3. A method as claimed in claim 2, wherein the air pressure is higher than an atmospheric pressure (about 0.1 MPa) inclusive, but lower than 2 MPa inclusive.

4. A method as claimed in claim 1, wherein said at least one transfer surface comprises a plurality of transfer surfaces and said at least one step comprises a plurality steps; and providing one of said plurality of steps on one side of said vent hole between said vent hole and one of said plurality of transfer surfaces and providing another of said plurality of steps on the opposite side of said vent hole between said vent hole and another of said plurality of transfer surfaces.

5. A method as claimed in claim 1, wherein the step of providing at least one step comprises providing a step in said at least one non-transfer surface completely surrounding said vent hole between said vent hole and said at least one transfer surface.

* * * * *

UNITED STATES PATENT AND TRADEMARK OFFICE
CERTIFICATE OF CORRECTION

PATENT NO. : 6,793,868 B2
DATED : September 21, 2004
INVENTOR(S) : Kanematsu et al.

It is certified that error appears in the above-identified patent and that said Letters Patent is hereby corrected as shown below:

Title page, Item [54] and Column 1, line 1,
Title, should read -- METHOD FOR PRODUCING A PLASTIC MOLDING BY INJECTION MOLDING --

Title page,
Item [75], Inventors, should read:
-- [75] Inventors: Toshihiro Kanematsu, Kanagawa (JP);
Yasuo Yamanaka, Kanagawa (JP);
Akira Fukushima, Kanagawa (JP);
Kiyotaka Sawada, Kanagawa (JP);
Motoyasu Murai, Kanagawa (JP) --

Signed and Sealed this

Seventh Day of December, 2004

JON W. DUDAS
*Director of the United States Patent and Trademark Office*